United States Patent [19]

Carter, Jr. et al.

[11] 4,366,387
[45] Dec. 28, 1982

[54] WIND-DRIVEN GENERATOR APPARATUS AND METHOD OF MAKING BLADE SUPPORTS THEREFOR

[75] Inventors: J. Warne Carter, Jr., Burkburnett; J. Warne Carter, Sr., Wichita Falls, both of Tex.

[73] Assignee: Carter Wind Power, Wichita Falls, Tex.

[21] Appl. No.: 37,774

[22] Filed: May 10, 1979

[51] Int. Cl.³ .......................... F01D 5/14; F03D 7/04; H02J 3/08

[52] U.S. Cl. ........................................ 290/55; 290/44; 416/132 B; 416/141; 416/140; 416/226; 307/87

[58] Field of Search ............... 416/132 B, 139 A, 140, 416/141, 226, 230 A, 9, 11, 214, 140 R, 135 A; 290/43, 44, 54, 55; 322/35; 307/44, 45, 87; 156/214, 156; 52/120

[56] References Cited

U.S. PATENT DOCUMENTS

| | | | |
|---|---|---|---|
| 1,757,292 | 5/1930 | Caldwell | 416/135 A |
| 1,786,057 | 12/1930 | Fales | 416/132 B |
| 2,076,520 | 4/1937 | Swanson | 416/132 B |
| 2,174,717 | 10/1939 | Caldwell | 416/140 |
| 2,360,792 | 10/1944 | Putnam | 290/44 |
| 2,400,649 | 5/1946 | Larsen . | |
| 2,517,135 | 8/1950 | Rudisill | 290/44 |
| 2,687,863 | 8/1954 | Vogt et al. | 52/120 |
| 2,777,524 | 1/1957 | Chapman et al. | 416/135 A |
| 2,784,556 | 3/1957 | Perdue | 60/60 |
| 2,829,278 | 4/1958 | Flugstad | 307/57 |
| 2,832,895 | 4/1958 | Hutter | 290/44 |
| 2,949,967 | 8/1960 | Jovanovich | 170/160.53 |
| 3,018,832 | 1/1962 | Prewitt | 170/159 |
| 3,426,214 | 2/1972 | O'Malley | 290/55 |
| 3,484,174 | 11/1972 | McCoubrey . | |
| 3,647,317 | 11/1972 | Furlong . | |
| 3,673,422 | 11/1972 | Parke . | |
| 3,713,753 | 1/1973 | Brunsch | 416/230 A |
| 3,791,234 | 2/1974 | Kastan | 74/579 R |
| 3,850,545 | 11/1974 | Weir | 416/132 |
| 3,874,820 | 11/1974 | Fenaughty . | |
| 3,880,551 | 4/1975 | Kisovec | 416/134 |
| 3,891,347 | 6/1975 | Jacobs et al. | 416/32 |
| 3,943,020 | 3/1976 | Ashton et al. | 156/156 |
| 3,944,837 | 3/1976 | Meyers | 290/40 |
| 3,950,115 | 4/1976 | Eueler | 416/226 |
| 3,999,886 | 12/1976 | Ormiston et al. | 416/141 |
| 4,008,980 | 2/1977 | Noehren | 416/134 A |
| 4,012,169 | 3/1977 | Mouille | 416/134 A |
| 4,052,134 | 10/1977 | Rumsey | 416/140 |
| 4,081,220 | 3/1978 | Andrews | 416/230 A |
| 4,083,651 | 4/1978 | Cheney, Jr. et al. | 416/11 |
| 4,087,202 | 5/1978 | Musgrove | 416/132 B |
| 4,087,203 | 5/1978 | Ferris | 416/141 |
| 4,096,012 | 6/1978 | Belko et al. | 156/214 |
| 4,134,707 | 1/1979 | Ewers | 290/55 |
| 4,146,264 | 3/1979 | Korzeniewski | 322/35 |
| 4,148,594 | 4/1979 | Stafford | 416/214 |
| 4,201,514 | 5/1980 | Huetter | 416/37 |
| 4,205,235 | 5/1980 | Pal et al. | 290/55 |
| 4,274,807 | 6/1981 | Kenney | 416/48 |

FOREIGN PATENT DOCUMENTS

| | | | |
|---|---|---|---|
| 951301 | 7/1974 | Canada | 416/226 |
| 379292 | 8/1923 | Fed. Rep. of Germany | 416/132 B |
| 2715584 | 10/1978 | Fed. Rep. of Germany . | |
| 2831260 | 2/1979 | Fed. Rep. of Germany | 416/132 B |
| 2823525 | 8/1979 | Fed. Rep. of Germany | 416/9 |
| 2825061 | 12/1979 | Fed. Rep. of Germany . | |
| 908631 | 4/1946 | France . | |
| 988883 | 9/1951 | France | 416/11 |
| 2311196 | 12/1976 | France | 416/140 |
| 2413566 | 7/1979 | France . | |
| 313907 | 6/1929 | United Kingdom . | |
| 413615 | 7/1934 | United Kingdom . | |
| 612413 | 11/1948 | United Kingdom . | |
| 707620 | 4/1954 | United Kingdom | 416/226 |
| 1276356 | 6/1972 | United Kingdom | 416/230 |
| 388130 | 10/1973 | U.S.S.R. . | |

OTHER PUBLICATIONS

Aviation Week & Space Technology 3-20-78; p. 57.
*Machine Design,* Something in the Wind? ERDA Thinks so; Black, pp. 18-26, 5-20-76.
Jayadev, "Windmills Stage A Comeback", IEEE Spectrum, pp. 45-49; 11/76.

*Primary Examiner*—J. V. Truhe
*Assistant Examiner*—Shelley Wade
*Attorney, Agent, or Firm*—Shapiro and Shapiro

[57] ABSTRACT

Wind generator apparatus employs an induction generator with a wind-driven rotor. Connection of the induction generator to AC power lines is controlled by apparatus that compares generator rpm and line frequency. The rotor blades have a pretwisted, varying-chord inboard portion and an untwisted, constant-chord outboard portion. The blades are self-starting, operate efficiently over a range of wind speeds with constant pitch maintained by a torsional biasing mechanism, and pitch up automatically when the normal rpm operating range is exceeded. An improved blade-supporting spar of low torsional stiffness has an I-beam configuration with filament-wound flanges. A pitch damper prevents torsional oscillations while permitting the blades to pitch up readily. The rotor, which includes a teetering hub, is free to weather-vane about the axis of a supporting tower, but a yaw damper limits angular velocity. A guy wire and gin pole arrangement stabilizes the tower and permits easy raising and lowering of the tower.

39 Claims, 37 Drawing Figures

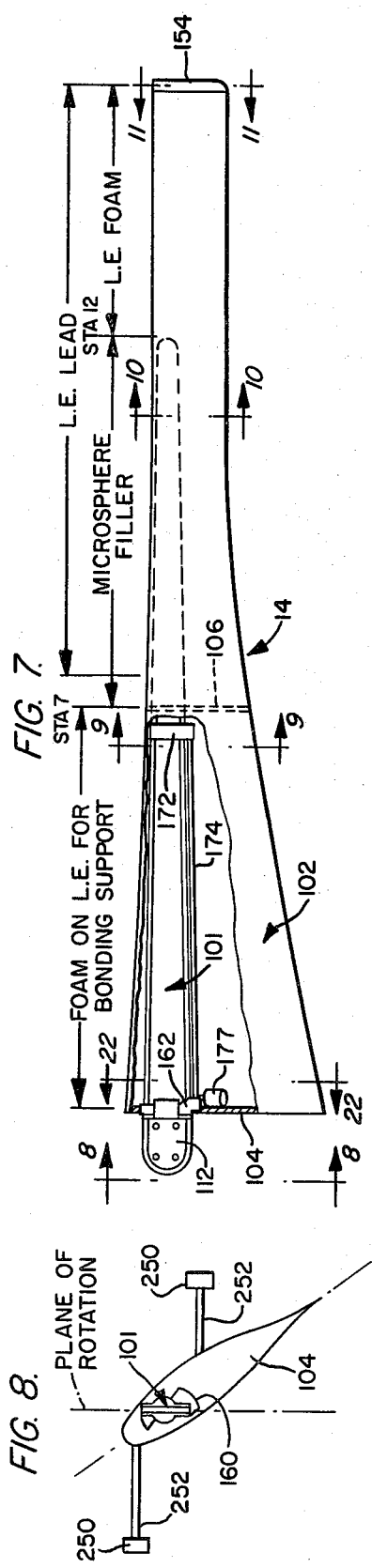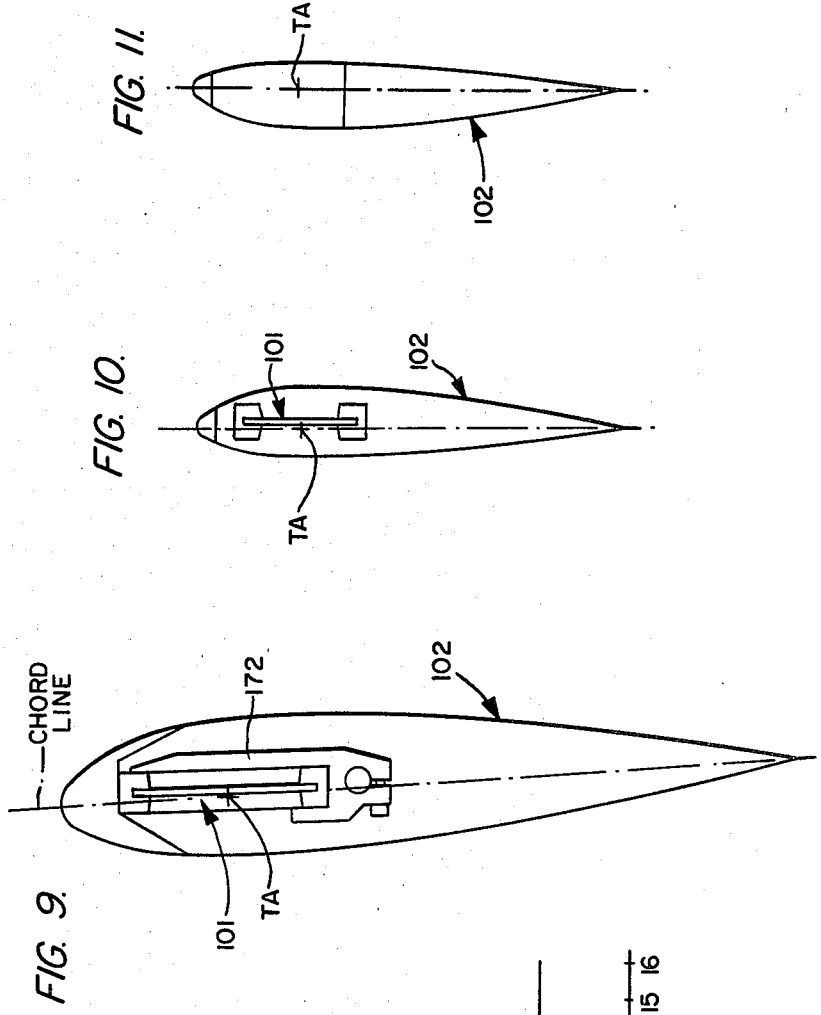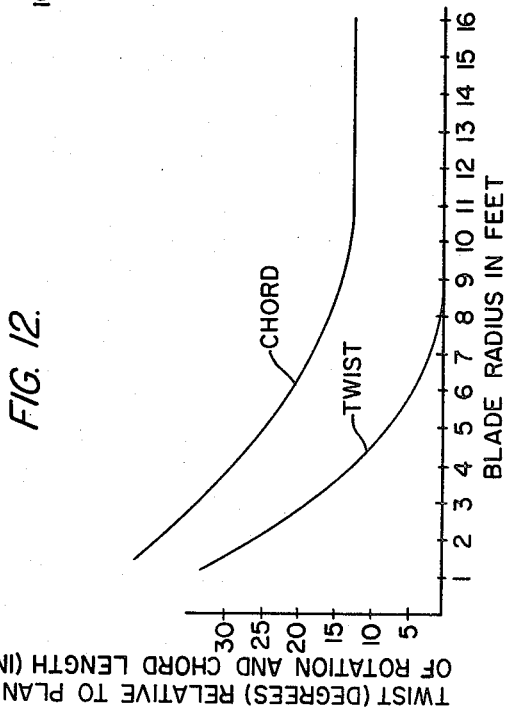

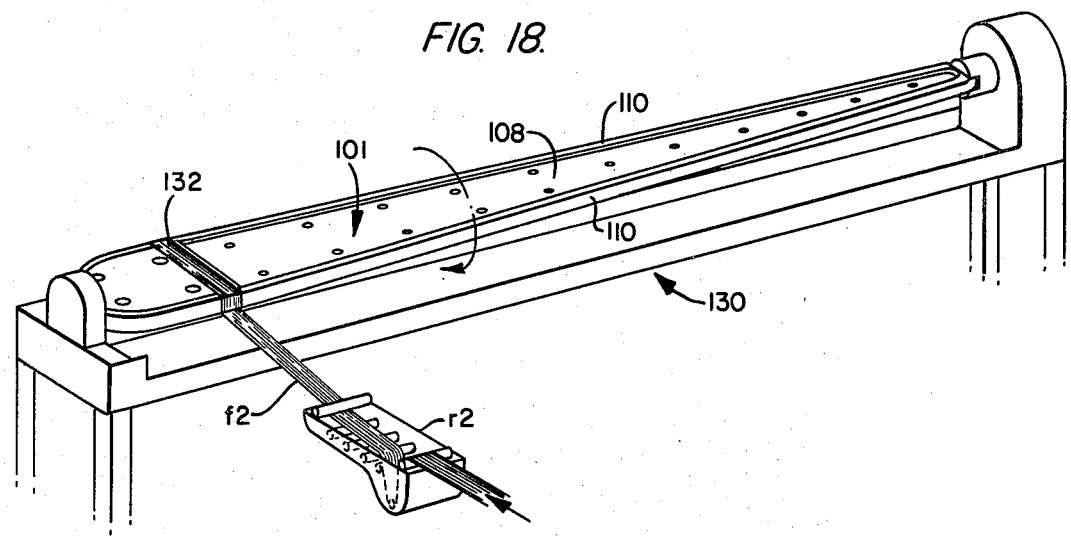
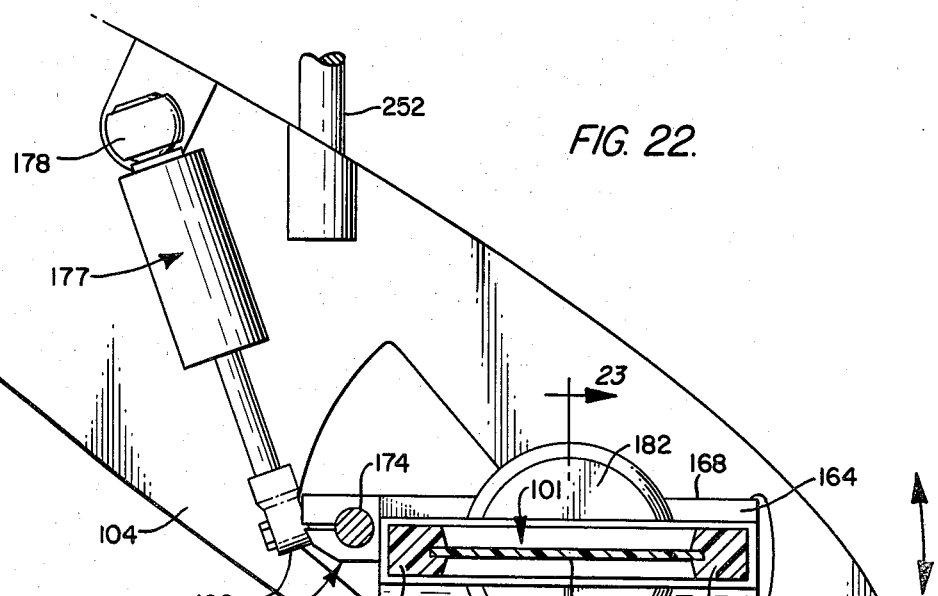
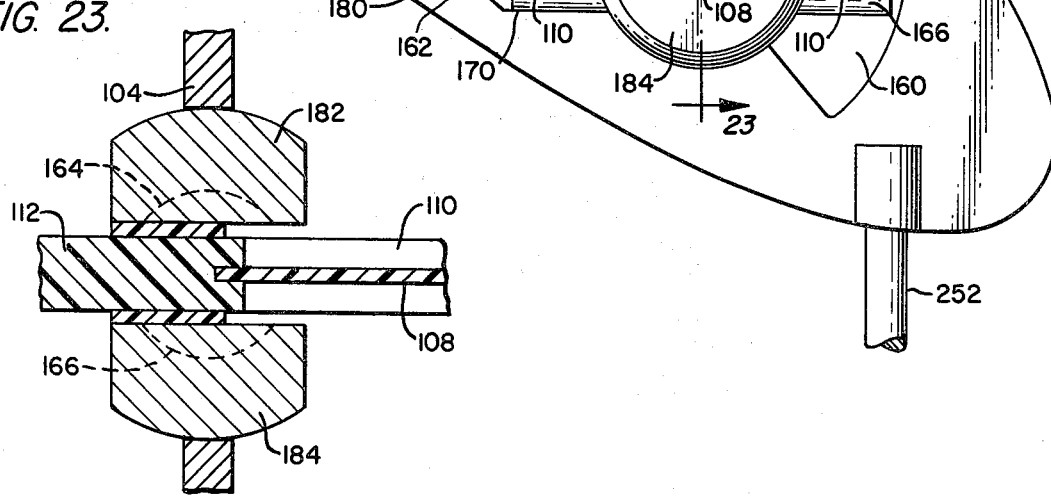

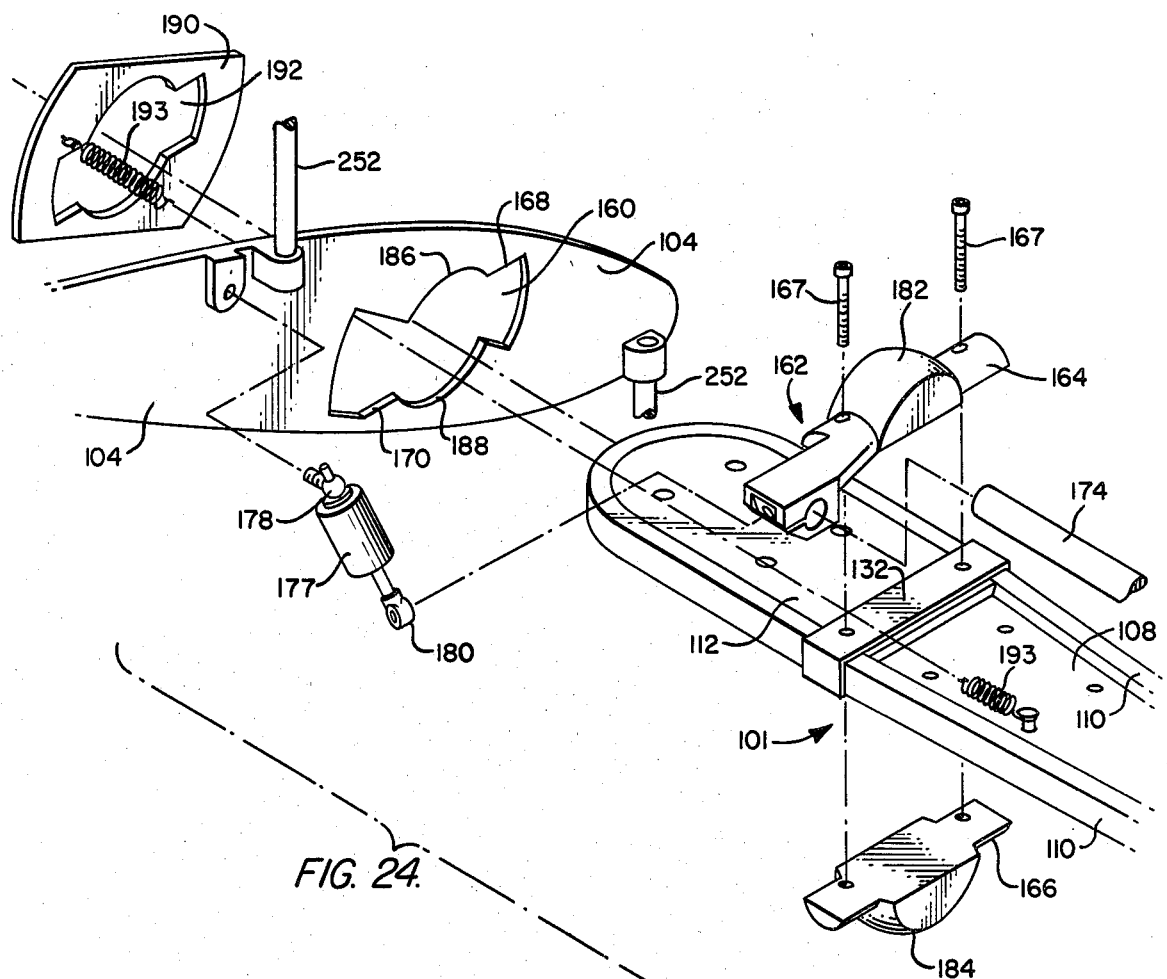
FIG. 24.
FIG. 25.
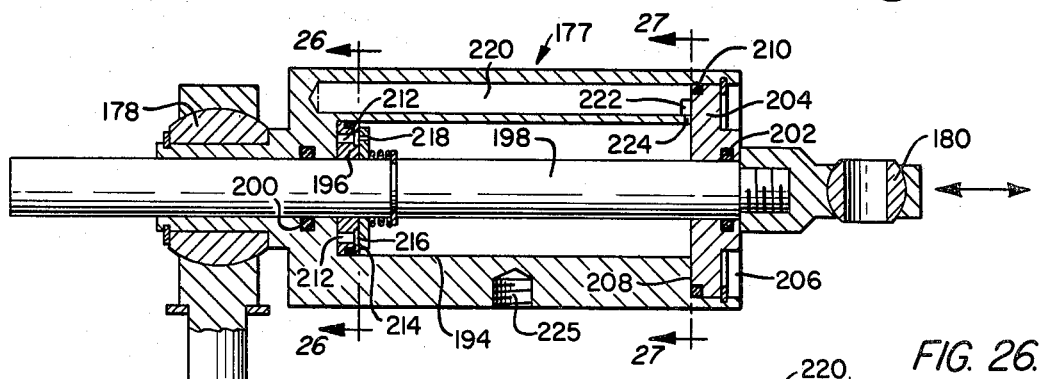
FIG. 26.
FIG. 27.
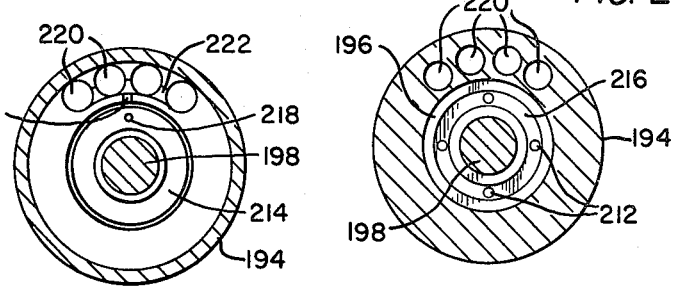

WIND-DRIVEN GENERATOR APPARATUS AND METHOD OF MAKING BLADE SUPPORTS THEREFOR

BACKGROUND OF THE INVENTION

This invention is concerned with improvements in the generation of electricity by wind power.

Shortages and increased cost of fossil fuels have stimulated renewed interest in the use of wind power to generate electricity. Electrical generators mechanically coupled to wind-driven rotors have been the subject of intense research and development, but problems of cost, reliability, efficiency, and safety have limited the adoption of such wind generator apparatus.

In an effort to accommodate a wide range of wind velocities, to provide self-starting blades, and to solve overload and overspeed problems, complex and expensive pitch changing mechanisms have been proposed. Fixed-pitch blades, while generally less expensive than variable-pitch blades, have not had the desired efficiency and safety and in some instances have not been self-starting. Manual or motor-driven yawing devices have often been required in order to orient rotors relative to the wind. Expensive cantilever tower support arrangements have been employed that are difficult to erect and that create difficulties in servicing the rotor and head assembly.

In order to obtain maximum benefit from a wind-driven generator, it is desirable that the generator be capable not only of supplying local needs when the wind velocity is sufficient but also of feeding excess power to the AC utility lines. When connected to the AC lines, the generator must generate electricity that is compatible with the AC on the lines and must not constitute a hazard to power company personnel.

In general, the prior art has failed to fill the need for a practical wind-driven generator.

BRIEF DESCRIPTION OF THE INVENTION

Accordingly, a principal object of the invention is to provide improved wind-driven generator apparatus.

Another object of the invention is to provide an efficient, self-starting wind generator rotor blade, with automatic overspeed control.

A further object of the invention is to provide an economical wind generator blade structure that is lightweight, strong, and capable of long life with little maintenance.

Another object of the invention is to provide an improved rotor blade supporting spar for a wind generator and an improved method of making the same.

Yet another object of the invention is to provide a wind generator rotor blade with a torsionally soft supporting spar that permits the blade to pitch up readily in an overspeed condition, and with a pitch damper that prevents oscillations which would otherwise occur because of the torsional softness of the spar.

A further object of the invention is to provide an improved structure that applies a torsional bias to a rotor blade of a wind generator in a manner that ensures a predetermined fixed blade pitch in a normal rpm operating range and that permits the blade to pitch up automatically when an overspeed condition occurs.

Still another object of the invention is to provide an improved structure for mounting an airfoil of a wind generator blade upon a supporting spar.

A still further object of the invention is to provide an improved blade structure that permits twisting and bending of a blade-supporting spar relative to an airfoil.

A further object of the invention is to provide a wind generator with a rotor that automatically and reliably weather-vanes so as to face away from the wind upon starting and that does not create gyroscopic forces.

Yet another object of the invention is to provide a wind generator with improved electrical apparatus for controlling the connection of an AC generator to utility lines.

An additional object of the invention is to provide an improved stable mounting arrangement for the tower of a wind generator that permits the tower to be raised and lowered readily.

Briefly stated, the invention is concerned with wind-driven generators in several aspects, including: (1) a rotor blade comprising an inboard portion and an outboard portion, the blade being shaped so that at rest the inboard portion has a substantial average pitch and the outboard portion has less average pitch than the inboard portion, the outboard portion being a substantially constant-chord portion; (2) a rotor blade that changes pitch in response to centrifugal force when the blade rotates at a velocity greater than a normal rotational velocity, and that has means for fixing the pitch of the blade independently of centrifugal force when the blade is rotating at the normal rotational velocity; (3) a rotor shaft, rotor blade means, and a teetering-hub supporting the blade means on the shaft for rotation with the shaft and for teetering movement relative to the shaft; (4) a blade supporting spar having a web with flanges that are formed by filaments extending longitudinally over edges of the web and embedded in a hardened matrix, the edges of the web being bonded to the flanges; (5) a method of making the spar, comprising longitudinally winding over the edges of an elongated web, filaments in a matrix capable of being cured to a hardened state, the winding being continued to form flanges along longitudinal edges of the web, and curing the matrix to harden the flanges and bond them to the web; (6) damper means that permits relatively free change of blade pitch in one direction but that damps a change of pitch in the opposite direction; (7) control apparatus that connects an induction generator to AC power lines upon attainment of a predetermined relationship between a reference signal and a signal dependent on the rotational velocity of the generator; (8) control apparatus including means for disconnecting a generator from AC power lines when the rotational velocity of the generator falls below a certain value and means for delaying disconnection of the generator from the AC power lines; (9) a tower having its base supported for movement about a horizontal axis so that the tower may be raised and lowered, and two pairs of guy wire elements extending from the tower and having means for anchoring lower ends of the elements so that the pairs of elements extend toward the ground in two orthogonal planes, respectively, one of which is perpendicular to the axis; (10) a tower having its lower end supported for pivotal movement about a horizontal axis so that the tower may be raised and lowered, a guy wire element having one end connected to the tower remotely from the pivotal axis, prop means having one end connected to the guy wire element at a region remote from the connection of the guy wire element to the tower and having means for supporting the opposite end so that the prop means may move with the tower as the tower is raised and lowered, and means for exerting a pulling force on the aforesaid region of the guy wire element during raising and lowering of the tower.

BRIEF DESCRIPTION OF THE DRAWINGS

The invention will be further described in conjunction with the accompanying drawings, which illustrate a preferred and exemplary embodiment, and wherein:

FIG. 7 is a plan view illustrating a wind-driven rotor blade in accordance with the invention, part of the blade being broken away and shown in section;

FIG. 8 is an end view of the blade of FIG. 7 as seen in the direction of arrows 8—8;

FIGS. 9-11 are enlarged diagrammatic sectional views taken along lines 9—9, 10—10, and 11—11, respectively, in FIG. 7;

FIG. 12 is a graphical diagram explanatory of the manner in which the blade of FIG. 7 is constructed;

FIG. 18 is a perspective view illustrating yet another step in the manufacture of the spar;

FIG. 22 is an enlarged fragmentary sectional view taken approximately along line 22—22 of FIG. 7;

FIG. 23 is a sectional view taken along line 23—23 of FIG. 22;

FIG. 24 is a fragmentary exploded perspective view illustrating details of the blade structure;

FIG. 25 is a longitudinal sectional view of a pitch damper in accordance with the invention;

FIGS. 26 and 27 are sectional views taken along lines 26—26 and 27—27, respectively, of FIG. 25;

DETAILED DESCRIPTION OF A PREFERRED EMBODIMENT

Figure 1:
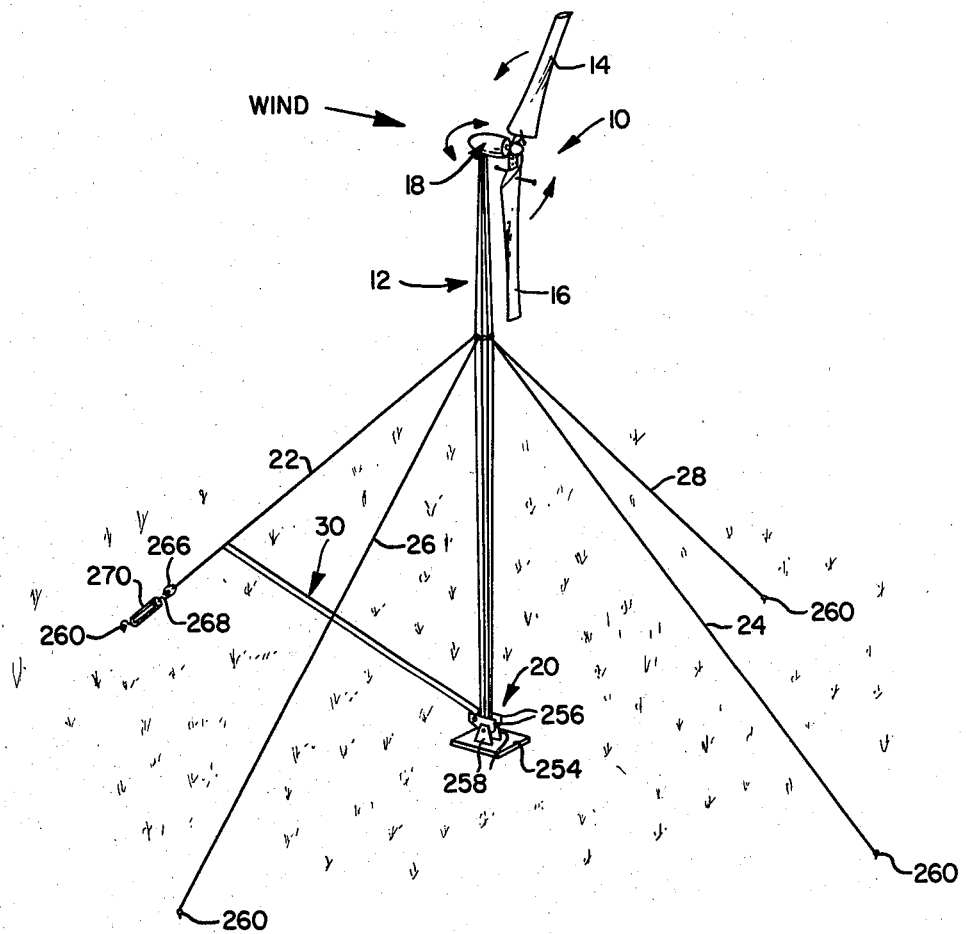
FIG. 1 is a perspective view illustrating the appearance, overall, of wind generator apparatus in accordance with the invention.

Referring to FIG. 1 of the drawings, illustrative wind-driven generator apparatus in accordance with the invention comprises a rotor 10 supported on a tower 12. In the form shown the rotor has a pair of blades 14 and 16 and is part of a head assembly 18 mounted on the top of the tower. The tower base 20 is supported on the ground and is stabilized by guy wire elements 22, 24, 26, and 28. A gin pole 30 is employed in raising and lowering the tower, as will be described later.

Figure 2:
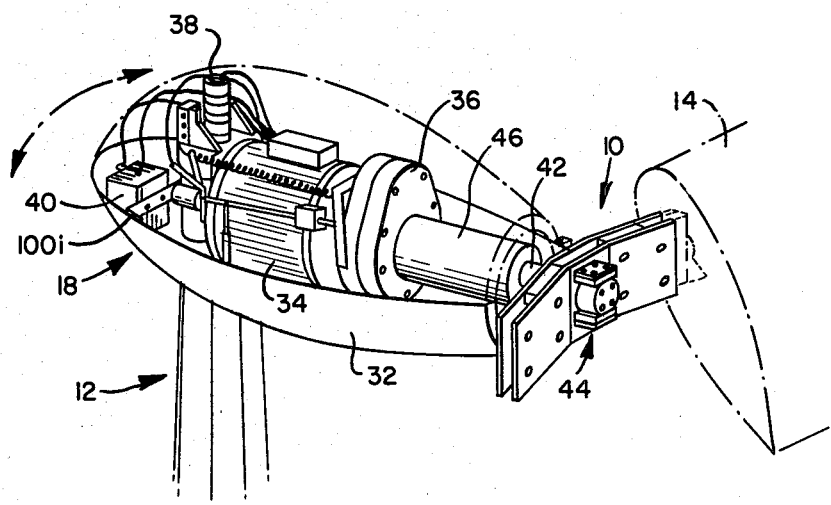
FIG. 2 is a perspective view of a portion of the apparatus forming the head assembly of the wind generator.

As shown in FIG. 2, the head assembly 18 comprises a streamlined housing or pod 32 which may be formed of fiberglass, for example, and which may include upper and lower sections that are bolted together (the upper section being indicated in phantom lines). Located in the housing is an AC generator 34 driven by rotor 10 via a gear box 36. Head assembly 18 is supported on the tower for yawing movement about the longitudinal axis of the tower, and a slip ring unit 38 and associated brushes permit electrical connections to generator 34 and other electrical apparatus designated generally by reference numeral 40 without concern for the yawing movement of the head assembly.

AC generator 34 is preferably an induction generator, that is, an induction motor that is driven above synchronous speed, when the slip becomes negative. The induction generator cannot generate its own exciting current; the exciting current is supplied by AC power lines. The frequency and voltage of the induction generator are those of the AC lines to which it is connected for excitation. Details of the generator and its control will be set forth later.

Figure 3:
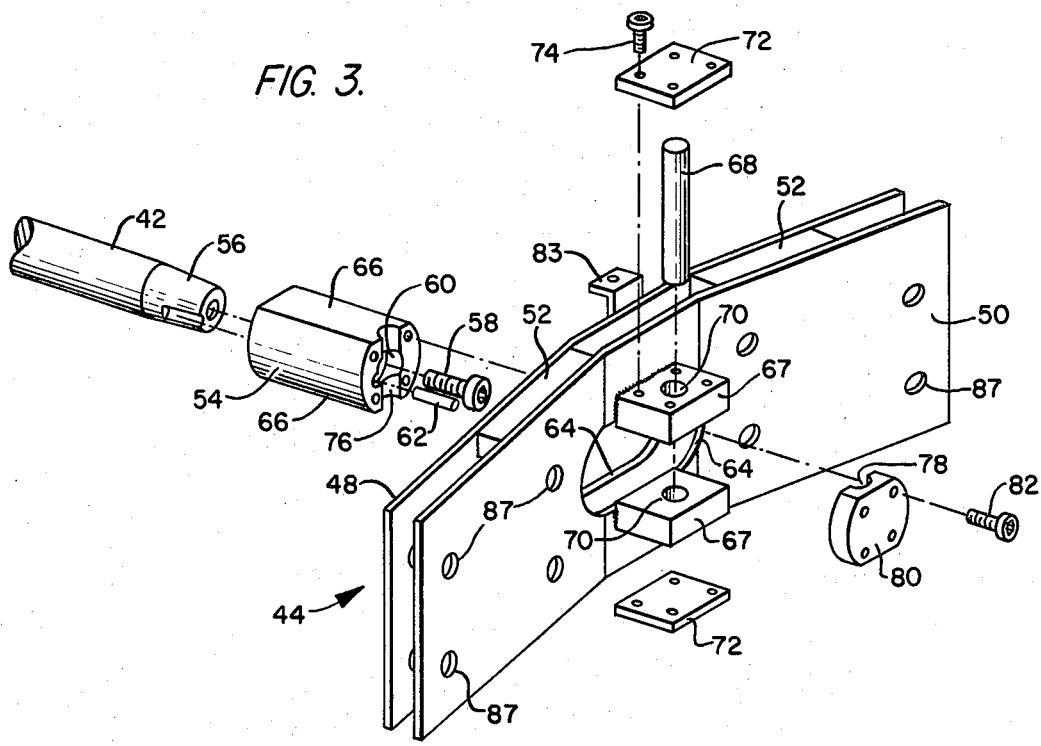
FIG. 3 is an exploded perspective view illustrating a preferred mounting hub structure for the rotor of the generator.

Rotor 10 is supported on a rotatable shaft 42 by means of a teetering hub 44. Shaft 42 is supported by conventional bearings (not shown) in a tubular housing extension 46 of the gear box 36. As shown in FIG. 3, the teetering hub may comprise a pair of parallel metal plates 48 and 50 which are spaced apart by pairs of spacers 52 that may be welded to the plates (only one pair of spacers 52 is shown in FIG. 3). The plates are angulated as shown to provide for pre-coning of the rotor blades, as will be described. A sleeve 54 supports the plates on shaft 42. The shaft may have a tapered end 56 which fits into a mating tapered bore (not shown) in sleeve 54 and may be secured to the sleeve by a screw 58 threaded into end 56 of shaft 42 through a bore 60 in the sleeve. A pin 62 inserted in mating off-axis recesses of sleeve 54 and shaft 42 fixes the sleeve to the shaft for rotation therewith.

Figure 4:
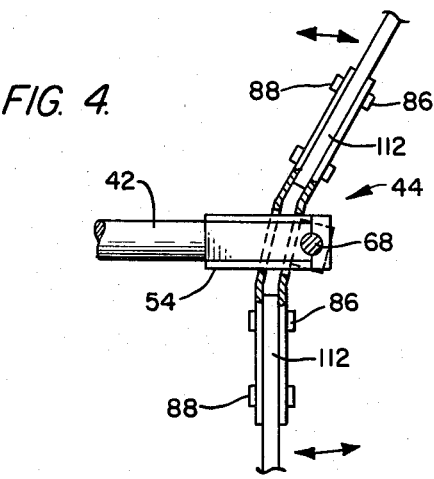
FIG. 4 is a fragmentary elevation view, partly in section, further illustrating the hub.

Sleeve 54 passes through elongated openings 64 in plates 48 and 50. The sleeve has a pair of parallel flat side surfaces 66 that are embraced between a pair of rectangular brackets 67 that may be welded to plate 50. A bearing pin 68 passes through bores 70 in the brackets and is held in position by a pair of plates 72 that may be fixed to the brackets, respectively, by screws 74. A transverse groove 76 at one end of sleeve 54 and a mating groove 78 in a plate 80 form a cylindrical bearing surface for pin 68 when plate 80 is attached to sleeve 54 by screws 82. A spinner (not shown) may be attached to hub 44 by appropriate brackets, one of which is shown at 83. As will be described later, each rotor blade has a blade-supporting spar, and each spar has a root block 112 received between plates 48 and 50 and fixed thereto as by bolts 86 (inserted in holes 87, FIG. 3) and nuts 88 as shown in FIG. 4. Teetering hub 44 has limited freedom for teetering movement relative to shaft 42 about the axis of pin 68, the movement being limited by the length of slots 64 or by snubbers on shaft 42.

Figure 5:
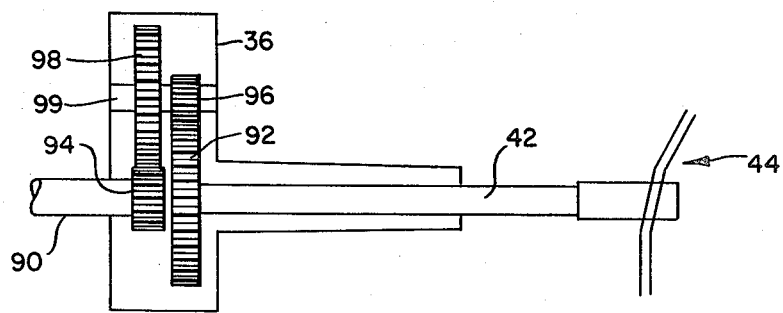
FIG. 5 is a diagrammatic longitudinal sectional view showing the hub in association with a rotor shaft and gear train.

FIG. 5 shows, diagrammatically, the drive train of the wind generator, from the teetering hub 44 via shaft 42 and the gear box 36 to shaft 90 of the AC generator. The gear box, which may be conventional, includes input gear 92 mounted on shaft 42, output gear 94 mounted on shaft 90, and intermediate gears 96 and 98 fixed to a shaft 99 and meshed with gears 92 and 94, respectively.

Figure 6:
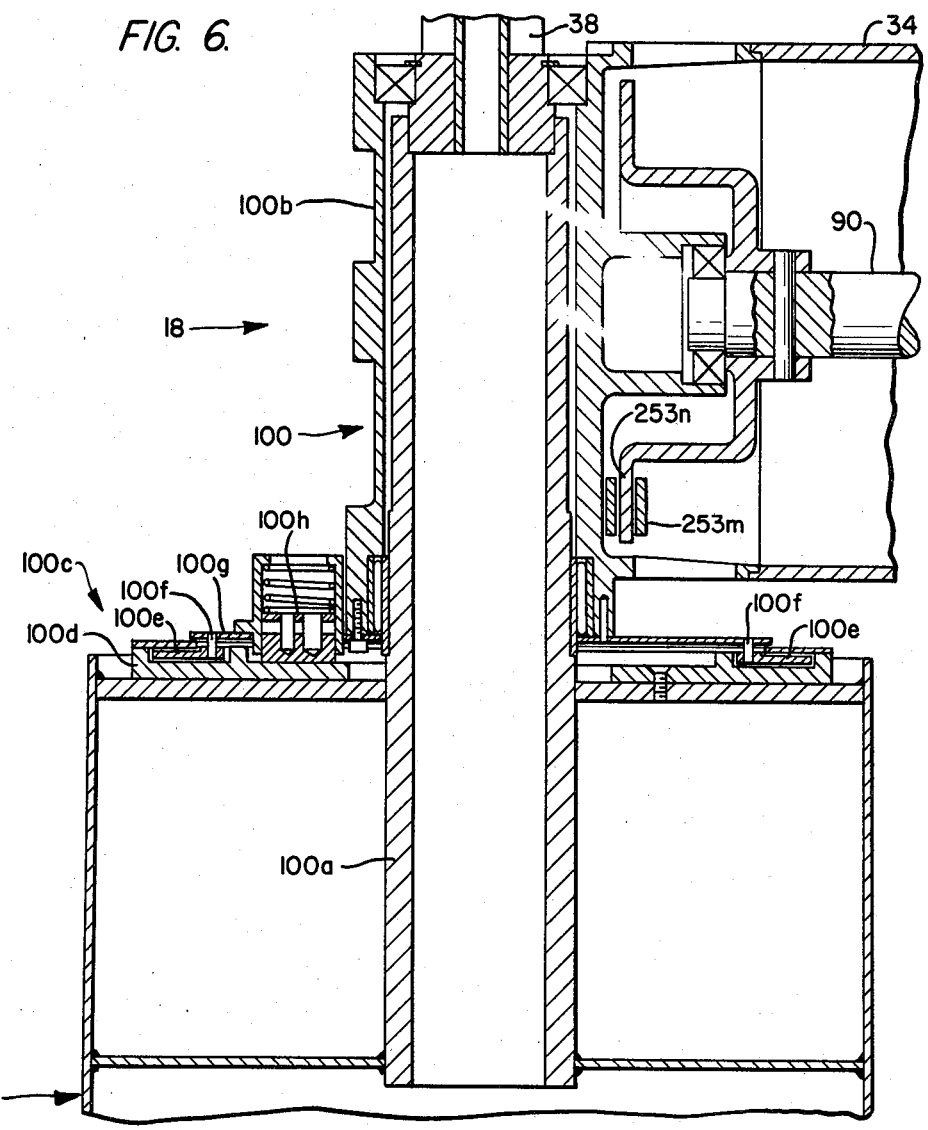
FIG. 6 is a vertical sectional view illustrating a yaw bearing and yaw damper at the top of a tower.

As shown in FIG. 6, generator 34 is supported, cantilever-fashion, on a yaw-bearing structure 100, including, inter alia, an inner bearing tube 100a projecting from the top of tower 12 and an outer bearing tube 100b fixed to generator 34. For reasons to be described hereinafter, a yaw damper 100c damps the yawing movement of head assembly 18. Damper 100c may comprise an annular metal channel 100d mounted on top of the tower and containing a ring 100e in a thick silicone grease. The ring is attached by pins 100f to a disk 100g fixed to tube 100b. A spring-biased metal rubbing block 100h, also mounted on disk 100g, contacts channel 100d and provides a lightning ground. Yaw bearing structure 100 provides support for the entire head assembly 18. Housing 32 (FIG. 2) may be mounted on the yaw bearing and gear box by means of metal straps, one of which is shown at 100i in FIG. 2. A hole (not shown) in the bottom part of the housing permits the housing to turn about the axis of the tower.

A preferred construction of the rotor blades will now be described. While two rotor blades are shown in FIG. 1, the rotor may comprise one, two, three, four or even more blades. The blades are preferably identical, and thus a description of one will suffice for all.

As shown in FIGS. 7-11, the preferred blade construction comprises a blade-supporting spar 101 and an airfoil 102. Typically, each blade is 16 feet long as measured from its rotational axis to its outboard tip, and the construction of the blade is conveniently described with reference to blade stations or blade radii identified by the distance in feet from the rotational axis.

The preferred blade airfoil has a twisted, varying-chord inboard portion and a flat or untwisted outboard portion (the term "flat" referring to the absence of twist). FIG. 12 shows the variation of twist and chord with blade radius. As is apparent, the twisted portion of the blade preferably extends to about station 9, and the varying-chord portion to about station 10. Between a root rib 104 and a mid rib 106 airfoil 102 is hollow. Spar 101, extends along the aerodynamic center of the blade (closer to the leading edge of the airfoil than to the trailing edge) and passes freely through the hollow inboard part of the airfoil, where it may twist and bend therein as will be described later.

Turning now to the details of the spar, FIGS. 13-18 illustrate the spar and a preferred method of making the same. The spar is preferably a tapered I-beam member having a web 108 and flanges or caps 110. At one end the spar has a root block 112, which may be cast from chopped fiberglass in an epoxy resin, for example. Web 108 may be cut from a sheet of fiberglass material made by laminating layers of glass cloth and epoxy resin, for example. The wider end of the web is preferably inserted in a kerf 114 of the root block (see FIG. 14).

Figure 15:
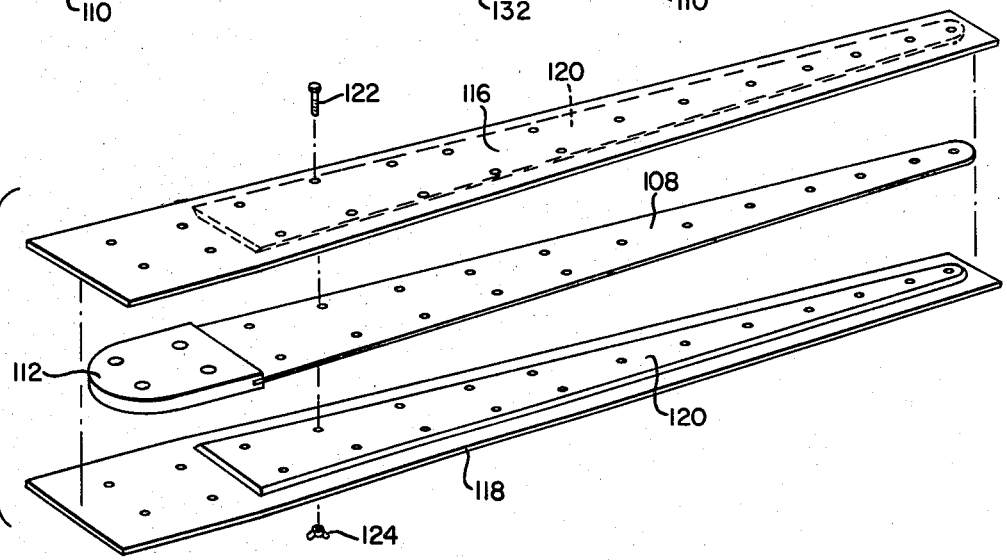
FIG. 15 is an exploded perspective view illustrating a step in a process of manufacturing the spar.
Figure 16:
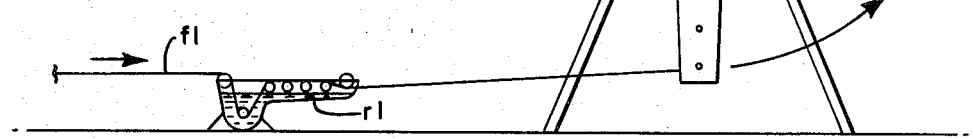
FIG. 16 is a diagrammatic side elevation view illustrating a further step in the manufacturing process.

As shown in FIG. 15, the assembly of web 108 and root block 112 is placed in a mold comprising a pair of mold pieces 116 and 118 having lands 120 which mate with opposite sides of the web. The mold parts are held together by means of screws 122 and nuts 124, the screws passing through appropriately placed holes in the mold parts and the web and root block assembly. The mold is then mounted on a frame 125 for rotation as a mandrel about a central axis perpendicular to the sides of the mold as shown in FIG. 16. Glass filaments f1 are then passed through an epoxy resin reservoir r1 and are wound longitudinally around edges of the web and root block assembly by turning the mold about its central axis as indicated in FIG. 16. Twelve parallel, resin-impregnated filaments or strands may be wound simultaneously to form a roving, the filaments passing over rollers and scrapers in the reservoir in a conventional manner and being guided out of the reservoir with the desired spread to form the roving.

Figure 17:
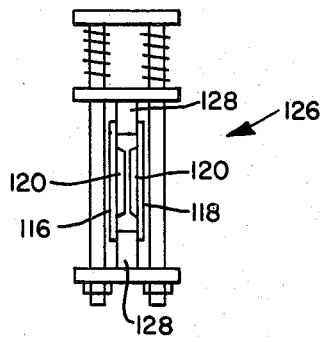
FIG. 17 is a diagrammatic end view illustrating another step in the manufacture of the spar.

The filaments are wound continuously about the edges of the web and the root block (e.g., 60 revolutions) to build up the flanges or caps 110 of the spar to the desired shape and size. Then the mold is placed in a frame 126 as shown in FIG. 17. The frame has a pair of rectangular plungers 128 spring biased toward each other so as to embrace the spar therebetween. Stops (not shown) on the plungers engage edges of the mold parts 116 and 118 and limit the insertion of the plungers into the mold to a desired depth, thereby defining the depth of the finished spar. The apparatus of FIG. 17 is placed in an oven, where the resin-soaked roving is cured in a conventional manner, forming a continuously wound cap that is bonded to the web of the I-beam, encapsulating the edges of the web.

The web, root block, and cap assembly is then removed from the apparatus of FIG. 17 and supported at opposite ends in a frame 130 for rotation about the longitudinal axis of the spar as shown in FIG. 18. Glass filaments or strands f2 are then passed through resin reservoir r2 and wound transversely about the root block and the flanges of the I-beam (e.g., 40 revolutions) as shown in FIG. 18, forming a strap 132, which, when cured, prevents the flanges from peeling away from the root block under high edge-wise loads on the spar. The finished spar is now ready for use. Advantages of the preferred spar construction will be set forth later, but first, preferred construction details for the remainder of the blade will be described.

As alluded to earlier, the spar is essentially free of the airfoil structure of the blade at an inboard part of the blade. Beyond that part the spar is secured to the airfoil, preferably by being embedded in a filler 134 (see FIG. 20) within the airfoil. The airfoil is preferably formed of a leading edge structure and trailing edge structures that are bonded together, as will be described. The filler is preferably in the leading edge structure only and extends from the mid rib 106 (station 7) to the outboard end of the spar (station 12), as shown in FIG. 7. The filler bonds the spar to the relatively low modulus skin of the airfoil and is somewhat flexible. In the preferred form the filler comprises glass microspheres in a resin matrix, for example a composition comprising 52% epoxy resin (such as Ciba-Geigy 6010), 31% popda hardener (such as Jefferson Chemical Co. 400), and 17% glass microspheres (Q-cell grade 200), by weight.

In making the leading edge section, a skin 136, which may be fiberglass cloth, is laid up wet in a suitable leading edge mold in which the spar is suspended. After the resin and hardener are mixed, the microspheres are added to the mixture and mixed therewith to form a paste. Then the mixture is poured into the mold while vibrating the mold. Curing may then be carried out at about 140° F. for about 5 hours, and then at about 170° F. for about 5 hours.

Figures 19, 20, 21:
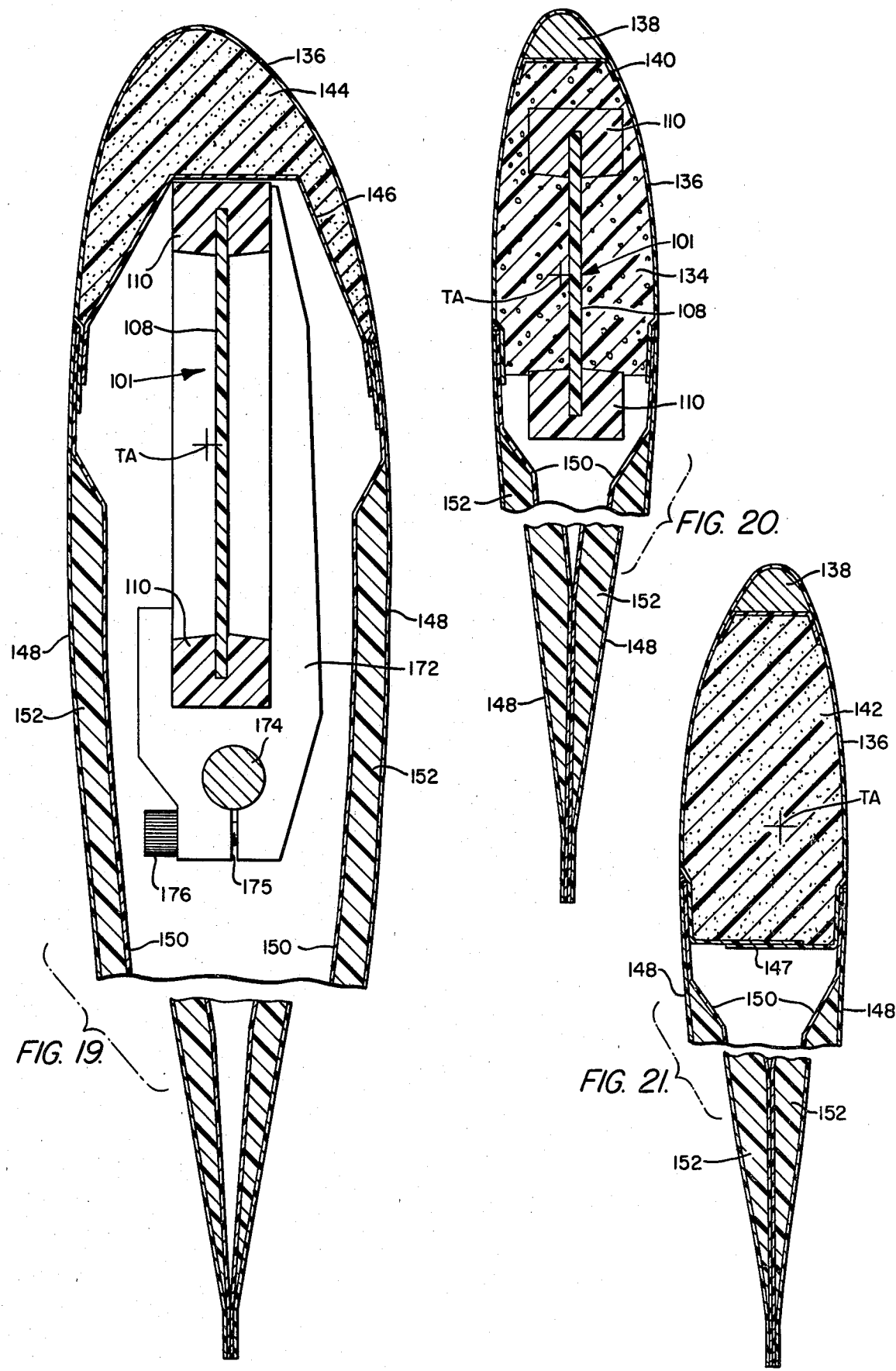
FIGS. 19, 20 and 21 are contracted sectional views illustrating in greater detail the blade structure at locations corresponding to FIGS. 9, 10 and 11, respectively.

As indicated in FIGS. 7, 20 and 21, a portion of the leading edge section of the airfoil is provided with a lead weight 138 which is bonded to the skin and is employed for chord-wise mass balancing purposes. The weight is inserted in the leading edge mold prior to the pouring of the filler, which may be separated from the weight by a layer 140 of fiberglass cloth. One flange of the spar preferably projects from the filler 134 at station 7 as shown in FIG. 20, but both flanges are encapsulated near station 12.

Beyond the outboard end of the spar, the leading edge skin 136 is preferably filled with foam 142 (e.g., PVC), as shown in FIG. 21. Similar foam 144 may be provided at the leading edge of the hollow inboard portion of the airfoil, as indicated in FIG. 7 and as shown in FIG. 19. This foam is employed for bonding support of the leading edge section of the airfoil during bonding. An inner skin (shear web) 146 may be provided in the hollow inboard portion, as shown in FIG. 19. Another inner skin may be formed, as shown at 147 in FIG. 21, by overlapping the ends of skin 136 over foam 142 at the outboard portion of the blade beyond the spar.

The trailing edge of the blade preferably has two skins that run the full length of the blade and are bonded to the leading edge section. These skins need to be as light as possible so that the outboard (constant-chord) portion of the blade can be mass balanced at a location that is preferably 23% of the chord length from the leading edge of the blade. Mass balance of the outboard blade portion is required to prevent blade flutter. The lightweight requirement can be met by employing a sandwich construction in which fiberglass sheets, such as 148 and 150 in FIGS. 19-21, are separated by cores such as lightweight PVC foam sheets 152. A procedure for laying up a trailing edge skin is as follows:

(1) Apply a mold release agent to a mold.

(2 Spray a heavy white polyester gel coat on the mold (this gel coat has excellent weathering properties and shields the structural fiberglass and resin from the destructive effects of ultraviolet rays).

(3) Lay up a sheet of Remay (Du Pont) and wet out the sheet with epoxy resin.

(4) Lay up one layer of glass cloth and wet out with epoxy resin.

(5) Position the foam core in place (the foam has already been cut to shape and bevelled).

(6) Lay up one layer of glass cloth on the foam and wet out with epoxy resin.

(7) Cure in an oven.

After the leading and trailing edge sections are formed, they must be bonded together. The final bonding operation may be done in a bonding fixture which holds all of the parts in their proper position. The leading edge with the spar attached thereto, the upper and lower trailing edges, and the root rib are all bonded together at the same time, by using epoxy resins, for example. Recesses molded into the leading edge section receive the trailing edge skins. After the bonding operation, the blade is removed from the fixture, cleaned and painted. The blade is then balanced spanwise by cutting a section off of the tip. The amount of resin used in laying up the different blade parts may be measured so that in all blades the most that has to be cut off of the tip to achieve balance is about 1 inch. A cap 154 (FIG. 7) may be bonded to the cut end.

Root rib 104 may be an aluminum plate. Mid rib 106 (FIG. 7) may be formed as a sheet of the same type of filler material 134 employed to embed the spar in the airfoil. It is preferably formed in two pieces, a leading edge piece bonded to the spar and the leading edge section and a trailing edge piece bonded to the trailing edge skins. Spar 101 passes through an opening (not shown) in the mid rib.

The root rib is shown in greater detail in FIG. 24 in association with spar 101 and other cooperating parts. Root block 112 of the spar passes through an opening 160 in the root rib. A spar bearing bracket 162 has cylinder segments 164 and 166 that embrace the spar at band 132. Countersunk bolts 167 pass through bores in cylinder segment 164 and the root block and are threaded into cylinder segment 166 to attach bracket 162 to the spar. The cylinder segments are located in opening 160 (see FIGS. 22 and 23) and engage mating parallel edge portions 168 and 170 of the opening which constitute twist stops as well as bearing surfaces that accommodate bending of the spar relative to the airfoil, as will be described shortly. Adjacent to mid rib 106 a further bracket 172 is provided (see FIG. 19). Bracket 172 embraces the spar but need not be bolted thereto.

Brackets 162 and 172 support a torsion bar 174. Each bracket is bifurcated, as indicated at 175, and has a bore which receives a corresponding end of the torsion bar. A screw 176 may be tightened to draw the bifurcations together to clamp the torsion bar in the bracket.

In accordance with the invention, the blade-supporting spar has high in-plane stiffness, low-beam stiffness (flatwise) and very low torsional stiffness. The high in-plane stiffness is required to increase the edge-wise natural frequency of the blade so that it is always higher than any rpm the blade might encounter, in order to avoid destructive edge-wise oscillations. The low beam stiffness facilitates coning of the blades, as will be described. The purpose of the very low torsional stiffness will now be described.

The blade construction of the invention maintains fixed pitch during the normal rpm operating range of the blade and pitches up automatically in an overspeed condition. As the blade starts to overspeed, the blade pitches up in response to centrifugal force, increasing the angle of attack of the blade relative to the resultant wind direction until the blade stalls, reducing the lift on the blade and increasing the drag rapidly. For any given wind velocity, the blade in an overspeed condition will pitch up until the blade driving force just equals the blade drag. At this point the blade will not turn any faster.

When the blade pitches up, the spar twists. The less torque required to twist the spar a given amount, the less the blade has to overspeed in order to produce that given torque. The torsionally soft spar of the invention reduces the torque needed to pitch the blade up. Since the length of the spar that twists is indirectly proportional to the torque required to twist the spar a given amount, the twisting part of the spar is made as long as practical by having an inboard portion of the spar free to twist relative to a hollow portion of the airfoil, as noted previously. For example, the airfoil may start at a 15 inch blade radius, but the spar may not actually be attached to the airfoil until the 84 inch radius.

As noted, it is desired that the blade pitch remain fixed until an overspeed condition is reached. Since the spar is torsionally soft, the spar is biased against twist stops to ensure that the desired pitch will be maintained in the absence of an overspeed condition. Torsion bar 174 is employed for this purpose. The torsion bar preloads the blade airfoil and root rib twist stops against the spar with about 150 foot-pounds of torque, for example. This preload is selected so that it is greater than the pitching up torque of the blade in the normal rpm range and holds the twist stops against the spar with the correct angle of attack for normal rpm.

To preload the spar against the twist stops the clamp forming a part of bracket 162 may be loosened, a bolt may be threaded into a tapped bore (not shown) in the end of the torsion bar associated with bracket 162, and a wrench may then be engaged with the bolt to twist the torsion bar the required amount, whereupon the clamp associated with bracket 162 may be tightened again to retain the torsional bias.

The pitching up moment is principally due to the inboard portion of the blade (for example, the inbaord 6 feet of a 16 foot blade, which may be termed the blade "cuff"). The weight of the cuff and its angle to the plane of rotation cause the pitching up moment . As the blade turns, centrifugal force tries to make each airfoil section twist to the plane of rotation. Since the blade cuff weighs more than the outboard portion of the blade and has a greater angle relative to the plane of rotation, its effect is much greater than the outboard portion even though the outboard portion is subjected to more centrifugal force. Typically the pitching up moment may be about 150 foot-pounds at a rotor speed of 120 rpm.

The inboard portion of the blade airfoil is pretwisted as the result of the molding operation. The twist axis TA has been indicated in FIGS. 9–11 and 19–21, and the twist produced by molding is apparent from the end views and sectional views of FIGS. 8–11 and 19–21. The torsional preload produced by the torsion bar forces the cylinder segments 164 and 166 of bearing bracket 162 into contact with edges 168 and 170 of opening 160 in the root rib but does not change the blade twist produced by the molding operation. Moreover, spar 101 remains flat even after preloading, and there are no shear stresses in the resin of the spar caps. Resin can creep at low shear stresses, changing the spar torsional stiffness for any given deflection. It is for this reason that the spar is not twisted in the preloading, but rather a metal torsion bar (or torque tube) is used which will not creep over an extended period of time, even if temperatures reach 120° F. Opening 160 has a butterfly shape that permits movement of the cylinder segments away from the twist stops when the blade pitches up during an overspeed condition. For example, the opening may permit the spar to twist 20° relative to the root rib. A maximum pitch-up of 20° is thus possible. During pitch-up the entire blade twists about the axis TA, and the inboard portion of the spar twists within the hollow portion of the blade.

The rotor of the wind generator operates over a wide rpm range and may reach 180 rpm, for example, during an unloaded condition in winds of say 125 mph. To prevent destructive torsional oscillations and blade instability conventional practice would dictate that the blades have a torsional natural frequency greater than 180 cycles per minute in the example given. This would require a blade spar stiff in torsion. A stiff spar would require more airfoil weight for overspeed pitch-up, which would tend to lower the natural torsional frequency of the blade, requiring higher spar stiffness to ensure that the natural frequency stays above 180 cpm—a vicious circle.

In accordance with the invention, a torsionally soft spar is employed, which would ordinarily produce a natural frequency less than 180 cycles per minute and lead to blade instability. However, a pitch damper 177 is employed to avoid this problem. The damper, which will be described in detail in a moment, permits the blade to pitch up easily but resists opposite pitching movement of the blade. The damper is attached to the root rib by a ball joint 178 and is attached to bracket 162 by a ball joint 180. Thus, the orientation of the damper may vary as the spar twists about its twist axis relative to the root rib. Because of space constraints, the mounting position of the damper on the root rib is such that twisting of the spar tends to move the spar width-wise in opening 160. To prevent such movement, cylinder segments 164 and 166 are provided with ball pieces 182 and 184, which may be integral with the cylinder segments, and opening 160 has spherical sections 186 and 188 that mate with the ball pieces. By virtue of this construction, the spar may twist in opening 160 but may not move laterally. A sealing plate 190 is spring biased against the inboard side of the root rib and has an opening 192 through which root block 112 of the spar passes. Opening 192 has a configuration similar to the configuration of the cylinder segments 164 and 166 and the ball pieces 182 and 184. The sealing plate "floats" on the spar and the root rib so that it freely accommodates movement of the spar relative to the root rib while sealing out water, birds, etc. from the interior of the blade. A coil tension spring 193 has its ends hooked through holes in the sealing plate and the spar to hold the sealing plate in place when the blade is stationary. Centrifugal force holds the sealing plate against the root rib when the blade is turning.

Damper 177 will now be described in detail with reference to FIGS. 25–27. As shown, the damper comprises a cylinder 194 (filled with hydraulic fluid) and a piston 196 fixed to a piston rod 198 for reciporcation along the axis of the cylinder. Piston rod seals are provided at 200 and 202. An open end of the cylinder is closed by a disk 204 that fits within an outer enlarged portion 206 of the cylinder and engages a shoulder 208. A seal is provided at 210. Piston 196 has passages 212 therethrough which are controlled by a valve plate 214 spring biased against the piston. A circular groove 216 may be provided in a face of the piston to provide for more area for the hydraulic fluid to push against valve plate 214. Valve plate 214 has one or more metering passages 218 communicating with the grooves.

When the piston moves to the right in FIG. 25, hydraulic fluid in cylinder 194 must pass through the metering passages 218 in order to pass through the piston. Movement of the piston is thus impeded. When the piston moves to the left, however, the hydraulic fluid forced through passages 212 lifts the valve plate 214 away from the piston (against the spring bias) and since the valve plate is of smaller diameter than the piston, the fluid passes through the piston and around the valve plate freely, so that movement of the piston is not impeded. By virtue of this construction, the blade may pitch up freely, but pitch-down movement is damped, thereby damping the torsional oscillations referred to previously.

After a long period of use, some of the hydraulic fluid in the damper may leak past the piston rod seals. This fluid would be replaced by air, and air in the cylinder 194 would change the damping characteristics undesirably. To prevent this problem, hydraulic fluid reservoirs 220 are bored in the wall of cylinder 194 and are filled with hydraulic fluid. One end of the reservoirs may be connected by an arcuate groove 222 in the shoulder 208. The groove is connected to the interior of the cylinder by a small port 224. Cylinder 194 is freely rotatable about the axis of piston rod 198. In use, the cylinder will be oriented (turned 180° from the orientation of FIG. 25) so that centrifugal force will tend to move the hydraulic fluid in reservoirs 220 into the interior of the cylinder (proper cylinder orientation being ensured by a bolt [not shown] in bore 225). Thus, if any hydraulic fluid leaks from the cylinder past the piston rod seals, it will be replaced by hydraulic fluid in reservoirs 220, and the air which otherwise would enter the cylinder will enter the reservoirs instead, where it will not interefere with the damping action.

Figure 33:
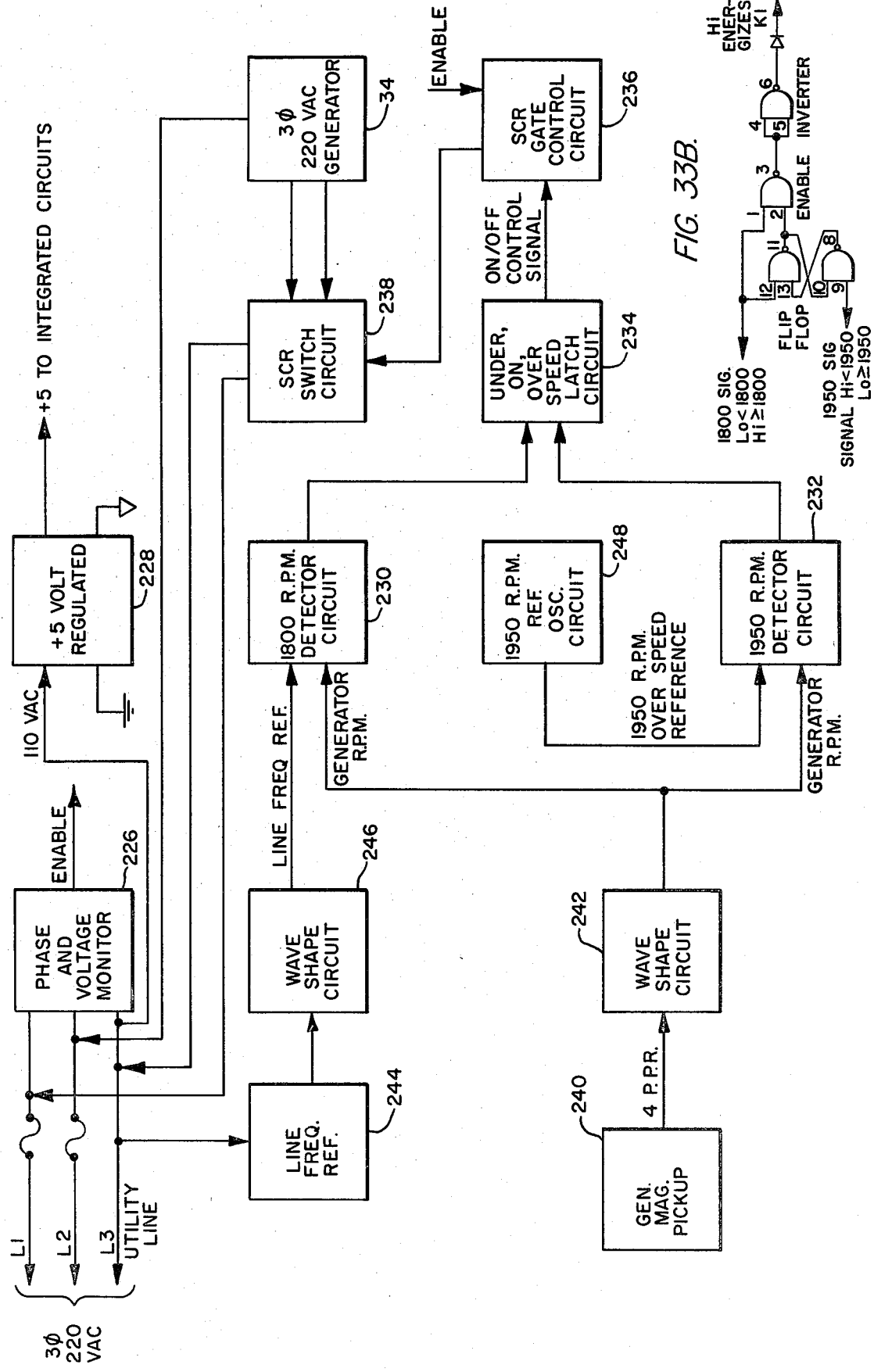
FIG. 33 is a block diagram illustrating a circuit that may be employed in accordance with the invention.

FIG. 33 illustrates a preferred electrical system employed in the invention. The electrical system includes a three-phase, 60-cycle induction motor that generates electricity when driven beyond synchronous speed. Such a generator is not self-exciting, and connection to the power lines of the utility company is necessary to provide the excitation current. To ensure that the generator is connected to the power lines only when it is capable of generating electricity, control apparatus connects the generator to the power lines only when synchronous speed is exceeded.

Typically an 1800 rpm induction motor is employed as the AC generator. The power that the generator produces increases as the generator rpm is increased beyond 1800 rpm up to approximately 1850 rpm. In this rpm range the current produced by the generator is always synchronous with line current and can be pumped back into the power lines, driving the utility company electric meter in reverse (assuming an appropriate type of meter, of course) and permitting the sale of electric power back to the utility company after local needs have been met. Since the induction generator cannot generate electricity if its source of excitation is cut off, when the power lines are not supplied with power from the utility company, there need be no concern about the lines being "hot" because of electricity from the wind generator. There is thus a built-in safety factor.

As shown in FIG. 33, the electrical system preferably includes a conventional phase and voltage monitor 226, and a conventional +5 volt regulated DC power supply circuit 228. Monitor 226 provides an "enable" output so long as proper phase and line voltage are maintained on utility lines L1, L2 and L3. The system also comprises two rpm detector circuits—a synchronous rpm detector circuit 230 and an overspeed rpm detector circuit 232. These detector circuits control a latch circuit 234, the output of which supplies an on/off control signal to an SCR gate control circuit 236, which is enabled by monitor 226 and which controls an SCR switch circuit 238 that determines when the generator 34 is connected to the utility lines. Only two of the connections to the three lines need be switched.

Detector circuits 230 and 232 are supplied with a generator rpm reference signal which may be produced by a conventional magnetic pickup 240 triggered by steel projections on the generator shaft. Four steel projections equally spaced circumferentially may be employed to produce four pulses per revolution, and the pulses may be shaped by a conventional wave shape circuit 242 to supply the generator rpm reference signal. A line frequency reference signal is also supplied to detector circuit 230 from line frequency reference circuit 244 and wave shape circuit 246. Detector circuit 230 compares its input signals, and any time the generator rpm signal is equal to or exceeds the signal from the line frequency reference circuit an "on" signal is supplied to latch circuit 234. By comparing the generator rpm signal with a line frequency signal, the line frequency can change slightly and the generator can still come on or go off at the proper time.

The overspeed detector circuit 232 receives a reference signal from a 1950 rpm reference oscillator circuit 248 and compares that reference signal with the generator rpm signal. Any time the generator speed is equal to or exceeds 1950 rpm, detector 232 supplies an off signal to latch circuit 234. Under normal conditions regardless of the wind velocity the generator rpm never exceeds 1950 rpm because the blade design is such that the blades stall and drop off in efficiency as the wind speed increases above 25 mph. The torque from the blades will never be greater than the reactive torque of the generator except for one case. That case occurs when load is lost on the generator (for example, when the utility lines are deenergized) and the rotor is free to speed up and turn the generator at an rpm greater than 1950 rpm. The, if the load is again applied to the generator, the blades are now moving faster and hence will not stall at the 25 mph wind speed. For example, if the blades are turning two times overspeed, or 240 rpm, and the wind is blowing at 40 mph, the blades will produce four times as much torque as they would if turning at their normal 120 rpm in a 40 mph wind. In this out-of-synchronous speed of the generator, the generator is not capable of producing enough torque to slow the rotor down, and hence the generator will burn up very quickly. Another potentially dangerous condition occurs when the generator is at about 2100 rpm. At this speed the induction generator is capable of producing approximately three times as much torque as it ever does at 1850 rpm. It is costly and not practical to design the gear box to take this high torque condition, so the electronics are preferably designed to keep the generator off when the rpm is greater than 1950.

Latch circuit 234 is latched off until the generator reaches 1800 rpm (assuming 60 cps line frequency). At 1800 rpm the circuit latches on and remains on until the generator rpm falls below 1800 rpm or rises to 1950 rpm. When the circuit latches off due to overspeed (1950 rpm or above), it will remain off until the generator rpm falls below 1800 rpm and then rises again to 1800 rpm.

Figure 33B:
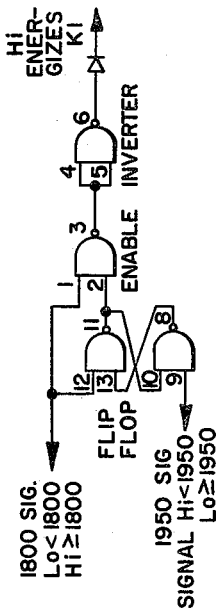
FIGS. 33A and 33B are circuit and logic diagrams, respectively, further illustrating the electrical system.
Figure 33A:
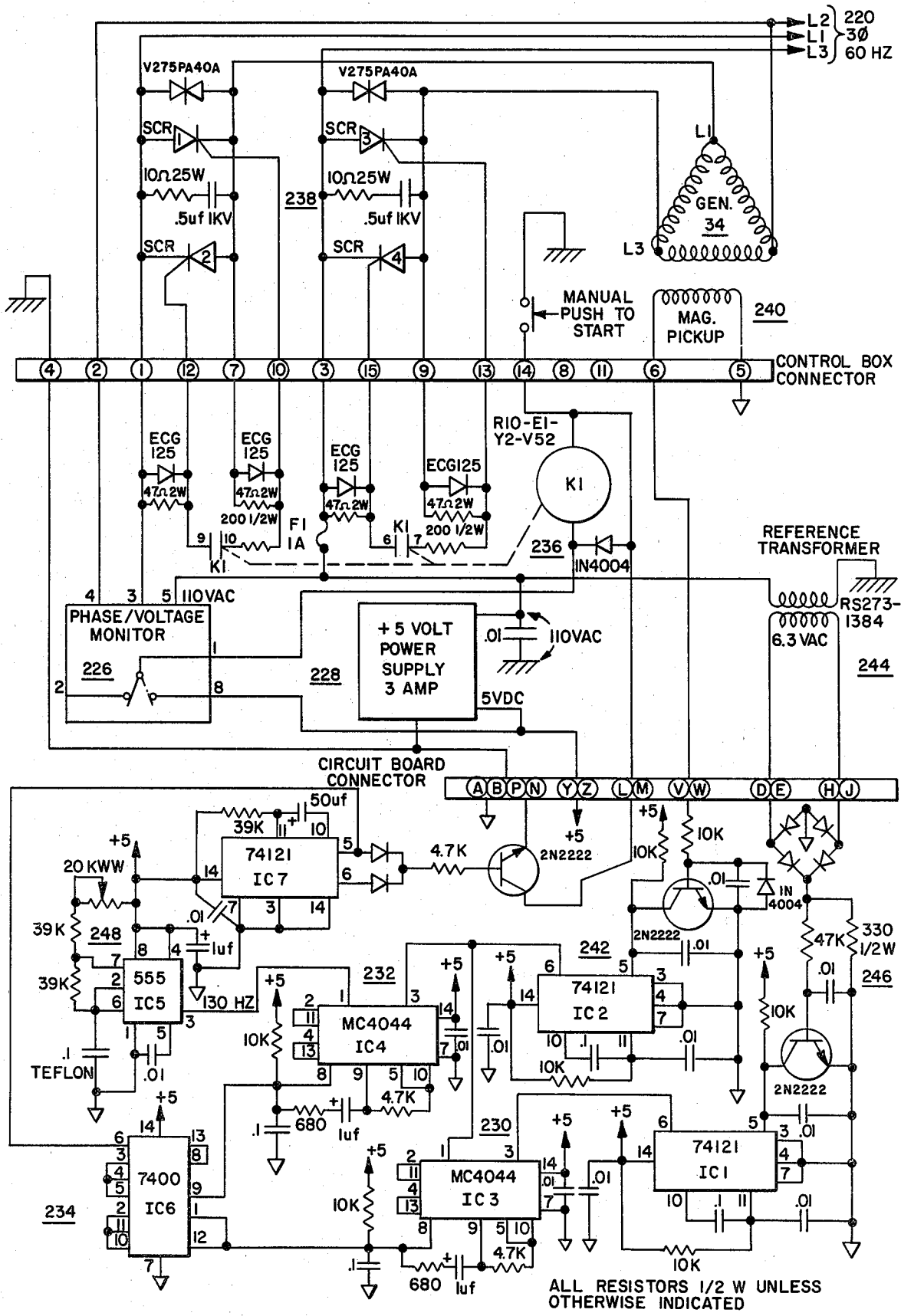

FIG. 33A is a more detailed wiring diagram of the electrical system. Typical component types and values are shown to illustrate the preferred embodiment. The underlined reference numerals in FIG. 33A show the general correspondence between the parts of that figure and the blocks of FIG. 33. Although a detailed description of the circuit is unnecessary, the following comments are appropriate. When the proper phase and voltage are detected by the conventional phase/voltage monitor 226, a path from one side of relay K1 (part of SCR gate control circuit 236) to +5 volts at terminals YZ is provided by the closing of a switch that connects terminals 1 and 8 of the phase/voltage monitor. This enables energization of the relay when the other side of the relay is connected to ground. The contacts K1 of the relay close to turn on the SCR's when the relay is energized. The relay energization circuit is completed by a signal from pin 6 of latch circuit 234 (IC6) which turns on the transistor connected to terminals ABPN on a circuit board connector and provides a path to ground. The manual push-to-start switch may be used to energize the relay when it is desired to start the rotor by operation of the generator as a motor.

A 60 cps voltage from the reference transformer is rectified by the full-wave rectifier connected to terminals DE and HJ of the circuit board connector to provide a 120 cps pulsating voltage that is shaped to a pulse train by the wave-shape circuit 246. IC1 is a one-shot circuit that produces a sharp pulse for each pulse of the 120 pulse train. A similar 120 pps signal is produced by the magnetic pickup 240, wave-shape circuit 242, and one-shot IC2. Thus, two 20 pps signals are supplied to the 1800 rpm detector circuit 230 (IC3) for comparison. The 1950 rpm detector circuit 232 (IC4) receives a 120 pps signal from IC2 and a 130 pps signal from the reference oscillator circuit 248 (IC5). IC3 and IC4 include conventional phase lock loops that compare the frequency of the input signals. IC3 produces a "high" output when the generator rpm reference signal is equal to or greater than the line frequency reference signal and IC4 produces a "low" output when the generator rpm reference signal is equal to or greater than the 1950 rpm overspeed reference. Latch circuit 234 (IC6) turns on relay K1, as indicated earlier, when the generator rpm is between 1800 and 1950 (assuming a 60 cycle line frequency), turns off the relay when the generator rpm is above 1950, and keeps the relay de-energized until the generator rpm falls below 1800 and then reaches 1800 again. A logic diagram of latch circuit 234 (IC6) is shown in FIG. 33B. A flip-flop has inputs connected to the outputs of the 1800 rpm detector circuit 230 and the 1950 rpm detector circuit 232, respectively. Below 1800 rpm, the output of the inverter is low. At 1800 rpm the output of the inverter goes high. At 1950 rpm the output of the inverter goes low. When the generator speed drops below 1950 rpm, the output of the inverter remains low because of the flip-flop state. When the generator speed falls below 1800 rpm, the flip-flop is reset, but the output of the inverter remains low until the generator speed reaches 1800 rpm again. IC7 is a 2-second delay circuit that prevents de-energization of relay K1 for 2 seconds after the loss of an energizing signal from IC6. This prevents "hunting" which might occur because of a drop in the speed of the generator when it is connected to the power lines or because of unequal spacing of the steel projections producing the rpm signal.

It is now appropriate to describe the general operation of the wind-driven generator apparatus of the invention. It is assumed that the wind generator has been installed as shown in FIG. 1 (a preferred arrangement for raising and lowering the apparatus will be described later). Assuming no wind, the rotor will always come to rest as shown in FIGS. 1 and 4, with the blades in a vertical plane and with the teetering hub tipped so that the lower blade is vertical and the upper blade is tilted forward. In this condition the head assembly 18 will weather-vane (yaw) so that the rotor 10 is down-wind before it reaches operating speeds (this would not occur if the rotor stopped with the blades in a horizontal plane). Once the rotor is rotating, the weather-vaning action will maintain the down-wind location of the rotor if the wind direction changes. It is thus unlikely for the rotor to operate while facing up-wind, a condition for which it is not designed. The large twisted blade cuff helps provide weather-vaning stability, so that no additional vertical stabilizer is needed. The teetering hub accommodates flapping stresses, of course. Teetering of the hub and resultant out-of-balance forces produced during yawing are minimized by the yaw damper of FIG. 6.

During normal operation, the rotor blades and the generator operate at an essentially constant rpm (about 120 rpm) that varies slightly with wind speed. A generator rpm of approximately 1805 may produce 2.5 kw, while a generator rpm of approximately 1850 may produce 25 kw. Since the only thing that causes the blade pitch to change is an overspeed condition, the blades normally maintain fixed pitch relative to the plane of rotation of the rotor. The blade plan form and twist rate are a compromise selected for best efficiency over a range of wind speeds. Final blade plan form and twist are a compromise between a blade chord selected for best efficiency in varying winds, pitch angle, and a blade chord/angle yielding good efficiency over a wide range of wind speeds and dropping off in efficiency very rapidly when the wind speed reaches a point that would overload the generator. To prevent the generator from being overloaded in wind speeds greater than 25 mph, a blade tip speed and blade chord are selected so that the blade starts to stall at wind speeds greater than 25 mph, thereby reducing the driving force. A judicious selection of generator size, pitch angle, tip speed, and blade chord will automatically keep the generator from being overloaded. Pitch controls employed in the prior art to start blade rotation, to provide an efficient blade for different wind velocities, and to avoid generator overload and overspeed are unnecessary. While a fully tapered variable-twist blade may be more efficient than the blade construction of the invention for any one wind speed, with varying wind speeds and with no pitch change the blade construction of the invention is more efficient, and is just as efficient as the fully tapered variable-twist blade with pitch control.

The blade plan form and twist in the preferred embodiment are designed to provide maximum energy from the wind at about 22 mph, good efficiency at about 10 mph, and a stall condition at about 25 mph (at about 125 rpm). Even though the area swept by the twisted inboard portion of the blade is small in comparison with the total swept area, the blade chord for best efficiency must be increased as it approaches the root of the blade, because the linear velocity is less near the root and because lift or rotor resistance to the wind is a function of velocity squared but is only a direct function of area. Among the advantages of the blade construction of the invention are:

(1) The blade has improved overall efficiency because of its ability to slow the wind passing through the swept area of the rotor more uniformly over the blade length.

(2) Because the wind is slowed down more ideally near the root of the blade, there is less of a hole in the center of the swept area for the wind to flow through. The net effect is that the improvement of blade efficiency with respect to a constant-chord, untwisted blade is greater than might be expected. By "plugging" the hole in the center of the swept area, the aspect ratio of the blade is essentially increased, improving the efficiency of the outboard portion (about 40% of blade length).

(3) A larger chord and more twist at the root improves the pitching-up moment of the blade, so less weight is needed to get the desired pitching-up moment.

(4) The large blade area and pitch angle of the blade cuff enable the blade to self-start without any pitch control. Thus the blade pitch for start-up can be the same as required during power generation.

(5) The large cuff provides more room for the spar to bend in high wind conditions when the blade is not rotating, avoiding damage to the skin of the cuff. Details of blade bending will be referred to in a moment.

As the blade goes into an overspeed condition, centrifugal force increases, increasing the pitching-up moment of the blade cuff (with rpm$^2$). This pitching-up moment is enough to overcome the preload of the torsion bar. A long metal torsion bar is used to minimize the torque increase when the blade comes off of its twist stops, and the metal can operate at much higher shear stresses than resinous materials normally employed to bond spar filaments together.

All types of resins normally used as bonding materials creep under low stress levels. The rate at which they creep is dependent upon stress and temperature. For this reason, the blade of the invention does not have the spar loaded in torsion while the blade is against the twist stops. Instead, the metal torsion bar is employed to take the preload torque. The torsion bar does not creep and change the preload. Since there is no twist in the spar during normal rpm, there is consequently no shear stress in the resin of the spar. The spar is only loaded in torsional shear when the blade is in an overspeed condition.

The metal torsion bar may be preloaded more than what is normally required to hold the spar against the twist tops. Thus, if the blade is in an overspeed condition for an extended length of time and some creep occurs in the bonding materials, the blade will always return to the twist stops during normal rpm conditions. To reduce the possibility of creep, the torsional shear stresses are kept as low as possible by making the twisting part of the spar as long as possible and by using a spar configuration having very low shear stress per angular deflection, while maintaining a given edge-wise stiffness. The I-beam spar construction of the invention provides the lowest possible spar torsional stiffness for a given edge-wise stiffness (much better ratio of torsional stiffness to edge-wise stiffness, with lower resin shear stresses, than is possible with a rectangular section).

A numerical example will further illustrate the preferred embodiment of the invention. If a long metal torsion bar is used, and a preload of 150 foot-pounds, for example, is achieved by a 60° twist of the torsion bar over its length, an additional 15° twist during overspeed would require an additional 37.5 foot-pounds of torque. With a torsionally soft spar requiring, for example, 4 foot-pounds of torque per 1° of twist, the torque required to twist the spar 15° during overspeed would be 60 foot-pounds. Assuming that the pitching up moment caused by the blade is 150 foot-pounds at 120 rpm, the total torque required to twist the blade 15° during overspeed would be 247.5 foot-pounds (150+60+37.5). The overspeed rpm necessary to twist the blade 15° would be the square root of [247.5÷150] times 120 rpm, or 154 rpm.

Figure 28:
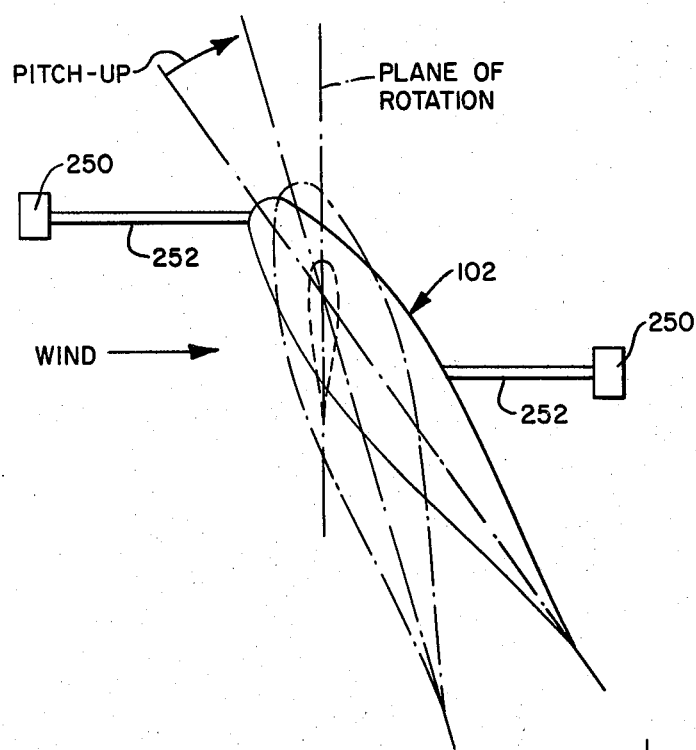
FIG. 28 is a diagrammatic view illustrating the manner in which the blade pitches up in an overspeed condition.

The overspeed pitch-up action, which is illustrated diagrammatically in FIG. 28, may be enhanced, if desired, by providing weights 250 mounted on the root rib by arms 252 (see FIG. 24 also). The weights, which may be streamlined to reduce air resistance, may be attached to the root rib so as to produce little or no torque about the twist axis of the spar until the spar moves off of the twist stops and then to produce increasing torque. The combined action of centrifugal force on the weights and on the blade cuff is sufficient to overcome the torsional bias of the cylinder segments against the twist stops only in an overspeed condition.

Figure 30:
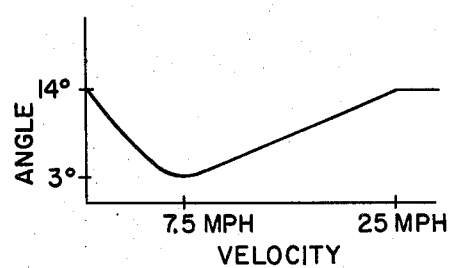
FIG. 30 is a graphical diagram illustrating variation of the coning angle of the blade with wind velocity.

The angle defined between the blade spars by the teetering hub (see FIGS. 3 and 4) may be such that each spar forms an angle of 14° with respect to the rotational plane when the rotor is at rest. As indicated in FIG. 30, when the rotor is rotating, the blade coning angle changes with the velocity of the wind, decreasing until a velocity of about 7.5 mph in the example given and increasing thereafter until a velocity of about 25 mph, after which the angle remains constant.

Figure 29:
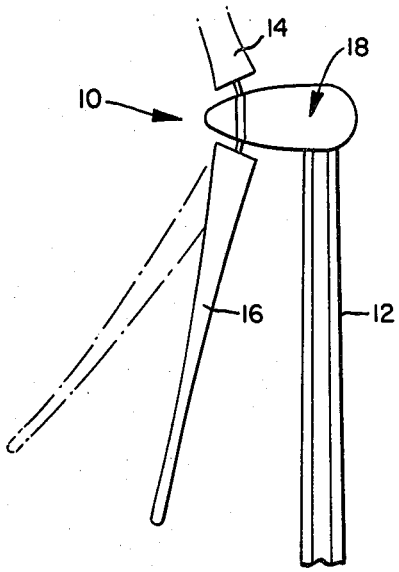
FIG. 29 is a diagrammatic view illustrating the manner in which the rotor blades may bend or cone in accordance with the invention.
Figure 31:
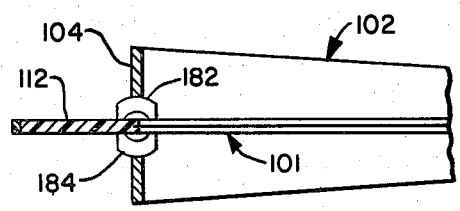
FIG. 31 is a fragmentary sectional view illustrating a detail of the blade construction.
Figure 32:
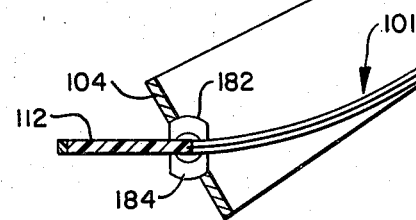
FIG. 32 is a fragmentary sectional view illustrating the manner in which the blade-supporting spar of the invention may bend relative to the blade airfoil structure.

A severe coning angle change illustrated diagrammatically in FIG. 29 in phantom lines can occur if the rotor is braked in a high wind condition. To avoid large stresses in the blade, the blades are constructed so that the inboard portion of the spar can bend substantially relative to the blade. FIG. 31 illustrates the relationship of the spar and the hollow portion of the airfoil when the spar is straight. FIG. 32 shows the bending of the spar that results from severe coning of a blade. The spar is bent flat-wise, with the cylinder segments accommodating the bending action by movement relative to the root rib. The spar can bend as much as 45° without binding at the root rib. The outboard portion of the blade (including the spar embedded therein) may also bend slightly under the conditions depicted in FIG. 29.

Figure 6A:
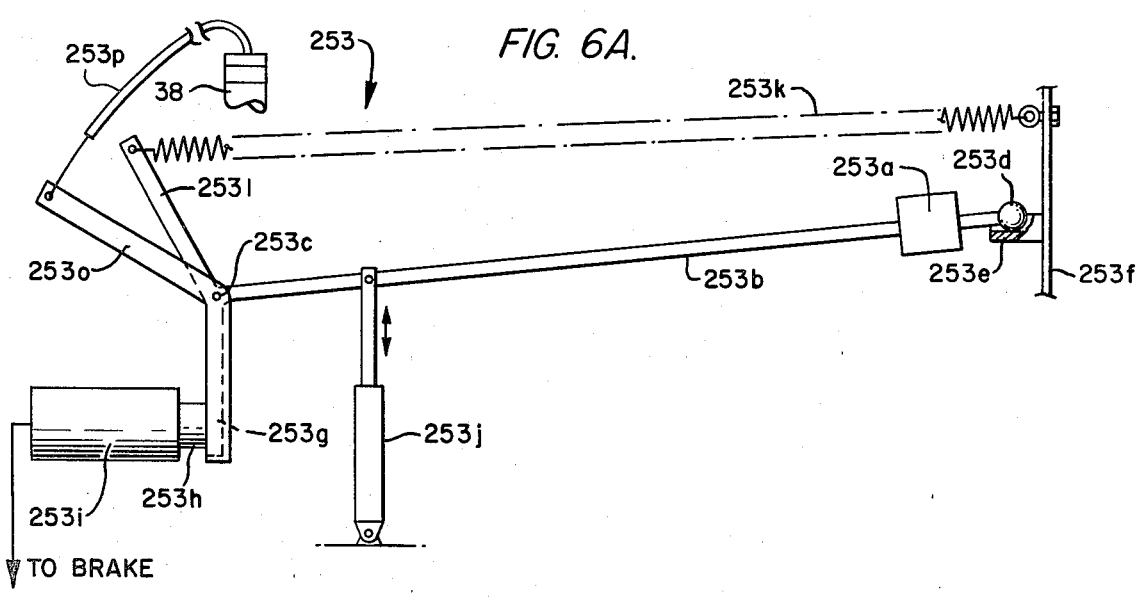
FIG. 6A is a somewhat diagrammatic perspective view of a braking system that may be employed in the invention.
Figure 13:
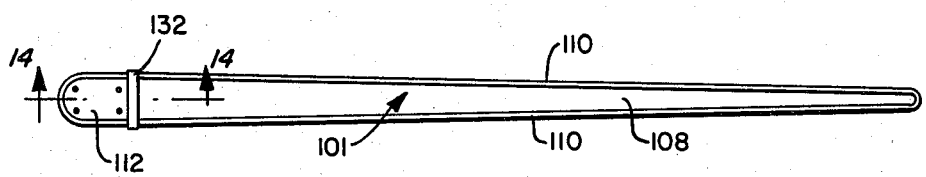
FIG. 13 is a plan view of a blade-supporting spar in accordance with the invention.
Figure 14:
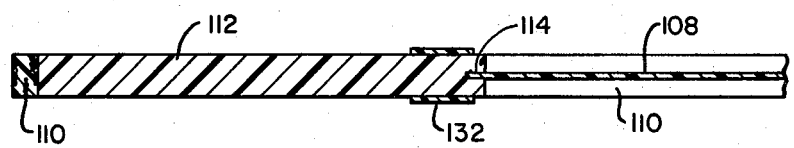
FIG. 14 is an enlarged fragmentary sectional view taken along line 14—14 of FIG. 13.

The wind generator apparatus of the invention may be provided with an appropriate braking system 253, which may have an out-of-balance actuator and a manual actuator, for example. As shown in FIGS. 2 and 6A, the out-of-balance actuator may comprise a weight 253a mounted on a rod 253b pivoted at 253c on a strap or the like ultimately supported by the yaw bearing. A free end of the rod has a ball 253d normally supported in a V-notch member 253e which projects from a plate 253f that is also ultimately supported by the yaw bearing.

Severe unbalance causes the ball 253d to be dislodged from the V-notch member 253e, so that the weight drops. An arm 253g of rod 253b then presses on an exposed end of a piston 253h of a master cylinder 253i. The downward movement of the weight is damped by a snubber 253j, and the pressure on the piston of the master cylinder is augmented by a coil spring 253k connected between an arm 253l of rod 253b and plate 253*f*. Until the ball 253*d* is dislodged from the V-notch member, the spring urges the ball more deeply into the notch. Master cylinder 253*i* is hydraulically connected to a caliper unit 253*m* (indicated diagrammatically in FIG. 6) that includes pads urged against a disk 253*n* fixed to generator shaft 90.

The manual actuator includes a lever 253*o* also pivoted at 253*c* and moved against piston 253*h* by a Bowden cable 253*p* that may extend through the slip ring unit 38 and downwardly through the tower to the ground.

Figure 34:
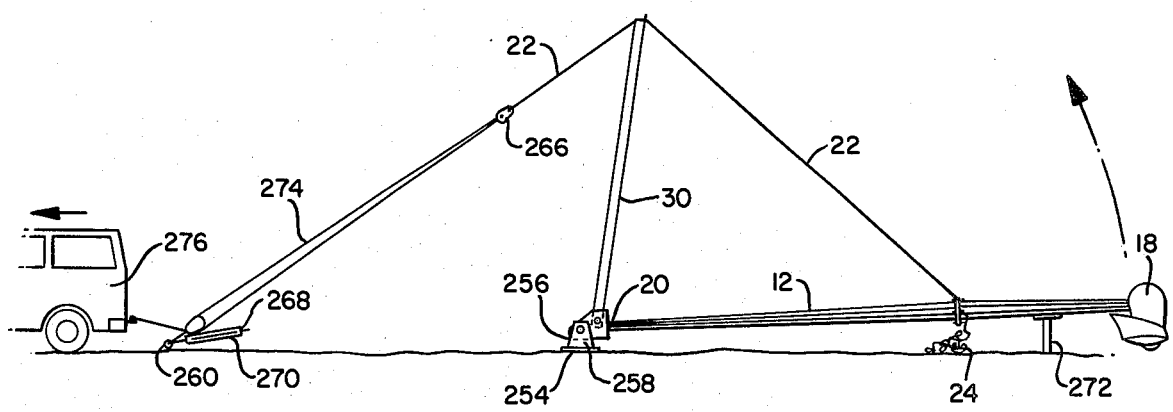
FIG. 34 is an elevation view explaining the manner in which the tower of the wind generator is raised.

In order to provide an economical wind generator, it is desirable that the head assembly 18 be supported on a tower 12 that can be easily raised and lowered without requiring complex and expensive apparatus for this purpose or for the purpose of maintaining the tower in a stable upright position. These goals are admirably achieved in accordance with another aspect of the invention. As shown in FIGS. 1 and 34, the tower 12 may be a conventional tower having a metal shell with an octagonal cross-section, with its base 20 supported on a base plate assembly 254 that may be anchored on the ground in any conventional manner. The bottom of the tower has a pair of spaced plates 256 fixed thereto that may be embraced between a pair of cooperating plates 258 projecting upwardly from and fixed to the base plate assembly. A pivot pin extending through all four plates supports the tower on the base plate assembly and permits the tower to be lowered and raised about a horizontal axis.

Figure 35:
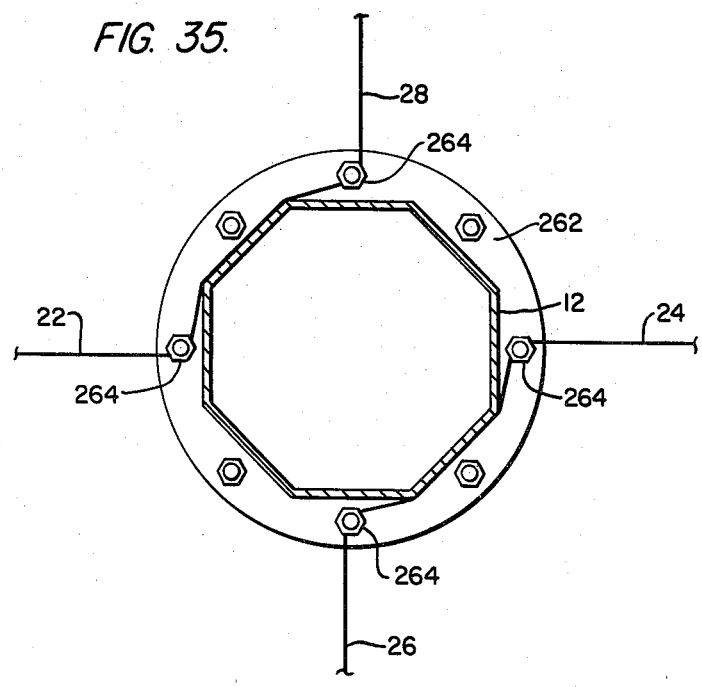
FIG. 35 is a horizontal sectional view illustrating the connection of guy wires to the tower.

The lower end of gin pole 30 is also mounted on plates 256 by a horizontal pivot, while the upper end of the gin pole is fixed to guy wire element 22 intermediate the length of the guy wire element. Guy wire elements 26 and 28 define a plane that contains the horizontal pivotal axis of the tower, while guy wire elements 22 and 24 define a plane that contains the gin pole 30 and that is perpendicular to the horizontal pivotal axis of the tower. The lower end of each guy wire element is fixed to the ground by a conventional ground anchor 260. The upper end of each guy wire element is fixed to the tower at a location intermediate the length of the tower. As shown in FIG. 35, guy wire elements 22 and 28 may actually be part of one continuous guy wire, and guy wire elements 24 and 26 may be part of another continuous guy wire. Each guy wire may be affixed to the tower sections are bolted together, the guy wires being clamped against a flange plate by bolts 264. The tower may be 55 feet high, for example, and the guy wires may be attached to the tower at a location about 16 feet from the top.

One of the guy wire elements, element 22 in the illustrative example of FIGS. 1 and 34, is connected to its ground anchor by a releasable coupling, which may include an eye 266 fixed to the lower end of wire element 22 and a cooperating hook 268 connected to the associated ground anchor by a turnbuckle 270 that permits adjustment of the effective length of guy wire element 22.

When eye 266 is released from hook 268, tower 12 and gin pole 30 may be turned as a unit in the plane of guy wire elements 22 and 24. The tower may thus be lowered to a position as shown in FIG. 34 in which the head assembly 18 is close to the ground and available for maintenance. When the tower is in this position, guy wire element 24 is slack. The plane defined by guy wire elements 26 and 28 (not shown in FIG. 34) merely turns downwardly about the horizontal line defined between the ground anchors 260 of these guy wire elements as the tower is lowered. In the lowered position, the tower rests on a support 272 that holds the tower at an acute angle with respect to the ground.

To raise and lower the tower, eye 266 may be coupled to a block and tackle assembly 274 engaged with the ground anchor 260 of guy wire element 22 and having a cable that may be pulled by a vehicle 276 to draw eye 266 toward the associated ground anchor. By this arrangement, the tower is lifted off of pedestal 272 and erected to the position of FIG. 1, at which eye 266 is engaged with the hook 268 and is disconnected from the block and tackle. During the raising of the tower, gin pole 30 turns with the tower as a unit and finally assumes the position shown in FIG. 1. The gin pole serves to prop up the region of guy wire element 22 to which it is attached so that a pulling force may be exerted on that region with a mechanical advantage.

The tower mounting, raising, and lowering arrangement just described needs only a single gin pole (preferably attached to the base of the tower) and four guy wire elements and yet is quite stable under all of the conditions described (assuming that the included angle between the tower and the ground anchor 260 of guy wire element 22 is less than 180° when the tower has been lowered). The guy wire arrangement reduces the bending moment of the tower, permitting a lighter, cheaper tower and reduction of the size and cost of the tower base anchor. When not in use, the gin pole may be collapsed against the tower.

The preferred embodiment employs a plurality of features that perform in concert to provide a remarkably efficient, economical, and practical wind generator. Certain features of the invention may be varied somewhat while retaining many of the advantages of the invention. A few modifications will now be described briefly.

In the preferred embodiment, the inboard portion of the blade is twisted and the outboard portion is untwisted. The average pitch of the inboard portion is sufficient to ensure that the blade is self-starting without a pitch-changing mechanism. In some instances this could be achieved by an inboard portion (cuff) of uniform pitch (rather than varying pitch) and with an outboard portion having less pitch than the inboard portion (zero pitch, for example).

In some instances a spar having a channel configuration could be used, and the flanges could be bonded to the web without encapsulating the edges of the web.

In some instances control apparatus could be employed which compares the rpm signal from the generator with a reference signal that does not vary with AC line frequency. To avoid absorbing power from the AC power lines, the generator is connected to the AC power lines only when it is generating electricity. However, if the generator is connected to the AC power lines at synchronous speed, which is approximately 2–3 rpm before it reaches the speed at which electricity is generated, the amount of power absorbed may be insignificant.

The blade could employ a pitch fixing mechanism other than a spring biased (e.g., torsion bar) type, such as a stop or latch that is overcome by the centrifugal force applied to the blade when the blade goes into an overspeed mode. Also, the blade pitch could change during start-up and until the attainment of a normal operating speed and then be held fixed until the stop or latch is overcome by centrifugal force due to overspeed. With filament wound (resinous) spars some mechanism is required to hold the blade pitch independently of stress-produced creep; otherwise resin creep will vary the blade pitch (e.g., where centrifugal force twists a resinous spar to adjust blade pitch).

Although the prop which props up one of the guy wire elements to facilitate raising and lowering of the tower is preferably a single gin pole with one end fixed to the guy wire element remote from the connection of the guy wire element to the tower and with the opposite (lower) end supported for pivotal movement about the same horizontal pivotal axis as the tower, the lower end of the prop could pivot about an axis spaced from the pivotal axis of the tower, and a prop other than a single gin pole (e.g., an A-frame) could be employed. Also, a single propped guy wire element could be used for raising and lowering the tower and a different type of structure (such as a rigid strut) could be used to hold the tower erect once it is erected.

Although a blade which pitches up during overspeed is highly preferred, a blade which pitches down in an overspeed condition could have some of the advantages of the invention.

While a preferred embodiment of the invention and possible modifications have been shown and described, it will be apparent to those skilled in the art that further changes can be made without departing from the principles and spirit of the invention, the scope of which is defined in the appended claims.

We claim:

1. In wind-driven generator apparatus, a rotor blade comprising an inboard portion and an outboard portion, the blade being shaped so that at rest the inboard portion has a substantial average pitch and the outboard portion has less average pitch than the inboard portion, the outboard portion being a substantially constant-chord portion and the inboard portion having a chord that increases as the root of the blade is approached.

2. Apparatus in accordance with claim 1, wherein the outboard portion has substantially uniform pitch.

3. Apparatus in accordance with claim 1, wherein the inboard portion is twisted and the outboard portion is untwisted.

4. Apparatus in accordance with claim 3, wherein the outboard portion has a length approximately 40% of the length of the blade.

5. In wind-driven generator apparatus a rotor blade comprising an airfoil which at rest is twisted about a longitudinal twist axis and has a blade-supporting spar extending along the twist axis interiorly of the airfoil, an inboard part of the airfoil being hollow with the spar extending therein and free to twist relative thereto, the spar being embedded over an outboard part of its length in an outboard part of the airfoil.

6. Wind-driven generator apparatus having a rotor with at least one rotor blade, the blade comprising an airfoil configured and disposed relative to a plane of rotation of the rotor in a manner causing centrifugal force which acts on the blade when it rotates to produce a twisting force on the blade tending to change the pitch of the blade about a longitudinal blade axis, and pitch fixing means associated with the blade for preventing the twisting force from changing the blade pitch until the twisting force exceeds a predetermined value dependent on the rotational velocity of the blade and allowing the twisting force to change the blade pitch when said predetermined value is exceeded, wherein said predetermined value corresponds to a normal velocity of the rotor and wherein the pitch fixing means includes spring biasing means which fixes the pitch at all times except when the normal velocity is exceeded.

7. In wind-driven generator apparatus having a rotor blade wherein centrifugal force created when the blade rotates tends to change the pitch of the blade about a longitudinal blade axis, pitch fixing means for preventing centrifugal force from changing the blade pitch when the blade rotates at a normal velocity and for allowing centrifugal force to change the blade pitch when the normal velocity is exceeded, wherein the blade has a supporting spar including resin subject to creep when stressed and wherein the pitch fixing means fixes the pitch independently of the creep.

8. Wind-driven generator apparatus having a rotor with at least one rotor blade, the blade comprising an airfoil configured and disposed relative to a plane of rotation of the rotor in a manner causing centrifugal force which acts on the blade when it rotates to produce a twisting force on the blade tending to change the pitch of the blade about a longitudinal blade axis, and pitch fixing means associated with the blade for preventing the twisting force from changing the blade pitch until the twisting force exceeds a predetermined value dependent on the rotational velocity of the blade and allowing the twisting force to change the blade pitch when said predetermined value is exceeded, wherein said predetermined value corresponds with a normal rotational velocity of the rotor and wherein the blade pitches up when the blade rotates at a velocity greater than said normal rotational velocity.

9. In wind-driven generator apparatus having a rotor blade wherein centrifugal force created when the blade rotates tends to change the pitch of the blade about a longitudinal blade axis, pitch fixing means for preventing centrifugal force from changing the blade pitch when the blade rotates at a normal velocity and for allowing centrifugal force to change the blade pitch when the normal velocity is exceeded, wherein the blade has an airfoil and a supporting spar for the airfoil, and wherein the pitch fixing means comprises stop means connected to the root of the airfoil and means for biasing the root of the spar relative to the stop means, the biasing means being overcome by centrifugal force when the normal velocity is exceeded.

10. Apparatus in accordance with claim 9, wherein the airfoil is pretwisted.

11. Apparatus in accordance with claim 9, wherein the airfoil has a hollow inboard part through which the spar extends freely.

12. Apparatus in accordance with claim 11, wherein the airfoil has a root rib with a slot through which the spar passes, and has a sealing plate on the inboard side of the root rib with an opening through which the spar passes, the sealing plate being free to move on the root rib and being spring-biased against the root rib.

13. Apparatus in accordance with claim 11, wherein the airfoil and the spar have cooperative bearing means permitting the spar to bend in the hollow part of the airfoil to accommodate changes in the coning angle of the blade.

14. Apparatus in accordance with claim 13, wherein the spar is an I-beam that can bend flat-wise up to about 45°.

15. Apparatus in accordance with claim 11, wherein the spar extends along the aerodynamic center of the blade at approximately 23% of the chord from the leading edge.

16. Apparatus in accordance with claim 11, further comprising damper means permitting the blade to change pitch in one direction freely but impeding pitch change in the opposite direction.

17. In wind-driven generator apparatus, a rotor having a rotor shaft, rotor blade means, and a teetering-hub supporting the blade means on the shaft for rotation with the shaft and for teetering movement relative to the shaft, a tower adapted to be mounted vertically, means for supporting the rotor at the top of the tower for rotation with the hub and blade means at one side of the tower, the supporting means permitting the rotor to weather-vane about the vertical axis of the tower, and fluid damping means for damping movement of the rotor about the vertical axis of the tower.

18. In wind-driven generator apparatus, a rotor shaft, rotor blade means, and a teetering hub supporting the blade means on the shaft for rotation with the shaft and for teetering movement relative to the shaft, wherein the blade means comprises a pair of pretwisted blades extending oppositely from the teetering hub with a predetermined initial coning angle therebetween, each blade comprising an inboard portion and an outboard portion and being shaped so that at rest the inboard portion has a substantial average pitch and the outboard portion has less average pitch than the inboard portion, the outboard portion being a substantially constant-chord portion and the inboard portion having a chord that increases as the root of the blade is approached.

19. In wind-driven generator apparatus, a rotor blade supporting spar having an elongate web with flanges that are formed by filaments extending longitudinally over longitudinal edges of the web, the filaments being embedded in a hardened matrix bonding said edges of the web to the flanges.

20. Apparatus in accordance with claim 19, wherein the edges of the web are encapsulated end-to-end in the flanges.

21. Apparatus in accordance with claim 19, wherein the spar has an I-beam configuration.

22. Apparatus in accordance with claim 19, wherein the spar has a root block secured to one end of the web and the filaments extend over edges of the root block and the web continuously.

23. Apparatus in accordance with claim 22, wherein the root block and the flanges are circumscribed by other filaments embedded in a hardened matrix and extending transversely to the flanges.

24. Apparatus in accordance with claim 23, wherein the flanges, the web, and the root block comprise fiberglass material.

25. In wind-driven generator apparatus of the type having a rotor with a rotor blade that changes pitch in one direction responsive to centrifugal force acting on the blade when the blade rotates at a velocity above a predetermined velocity, and that then changes pitch in the opposite direction responsive to a reduction in centrifugal force, damper means that permits relatively free change of blade pitch in said one direction but that damps a change of blade pitch in the opposite direction.

26. Apparatus in accordance with claim 25, wherein the damper means comprises a hydraulic cylinder having a piston movable therein, the piston having a passage therethrough controlled by valve means, the valve means permitting fluid to flow through the passage relatively freely when the piston moves in one direction and restricting the flow through the passage when the piston moves in the opposite direction.

27. Apparatus in accordance with claim 26, wherein the cylinder has a reservoir in the cylinder wall at one side of the cylinder for storing hydraulic fluid therein, the reservoir being connected to the interior of the cylinder by a port that permits the hydraulic fluid in the reservoir to replace hydraulic fluid that leaks from the cylinder, the reservoir being located on the blade so that centrifugal force tends to move hydraulic fluid from the reservoir into the interior of the cylinder.

28. In wind-driven generator apparatus of the type having an induction generator, control apparatus for controlling the connection of the generator to AC power lines, said control apparatus comprising means for producing a reference signal dependent upon the frequency of the AC power, means for producing a signal dependent upon the rotational velocity of the generator, and means responsive to the attainment of a predetermined relationship between said signals for connecting the generator to the AC power lines.

29. Apparatus in accordance with claim 28, wherein the control apparatus comprises means for determining when the rotational velocity of the generator reaches an upper limit value and for disconnecting the generator from the power lines until the rotational velocity of the generator falls below a lower limit value and then reaches that value.

30. Apparatus in accordance with claim 28, wherein the connecting means includes means for connecting the generator to the AC power lines when the rotational velocity of the generator rises to a value at which said signals have said predetermined relationship and for disconnecting the generator from the AC power lines a predetermined period of time after the rotational velocity of the generator falls to a velocity below that value.

31. Wind-driven generator apparatus comprising a rotor that drives an induction generator, the rotor having blade means including an airfoil with an inboard portion and an outboard portion, the inboard portion being twisted about a longitudinal twist axis and having a chord that increases as the root of the airfoil is approached, the outboard portion being untwisted and having a constant chord, the blade means also including a blade-supporting spar extending along the twist axis interiorly of the airfoil, an inboard part of the airfoil being hollow with the spar extending therein and free to twist relative thereto, the spar being embedded in an outboard part of the airfoil, the blade means further including metal biasing means for providing a torsional bias that tends to twist the airfoil relative to the root of the spar, twist-stop means supported on the airfoil and against which the root of the spar is held in response to the torsional bias, and means for permitting the blade means to move about the twist axis so as to unseat the spar from the twist-stop means and thus to vary the effective pitch of the blade means, the blade means having a predetermined pitch that remains fixed until the blade means reaches a predetermined rotational velocity, whereupon the blade means pitches up in response to centrifugal force and unseats the spar from the twist-stop means, the spar being torsionally soft so that the blade means pitches up readily, the blade means also including damper means for damping torsional oscillations of the spar, and control apparatus for controlling the connection of the generator to AC power lines, the control apparatus comprising means for connecting the induction generator to the AC power lines only when the rotational velocity of the generator exceeds synchronous speed.

32. Apparatus in accordance with claim 31, wherein the spar has an I-beam configuration with flanges that are formed by filaments extending longitudinally over the edges of a web and embedded in a hardened matrix, said edges of the web being encapsulated in the flanges.

33. Apparatus in accordance with claim 31, wherein the damper means permits relatively free change of pitch of the blade means in one direction but damps a change of pitch in the opposite direction.

34. Apparatus in accordance with claim 31, wherein the control apparatus comprises means for determining when the rotational velocity of the generator exceeds an upper limit value and for disconnecting the generator from the AC power lines until the rotational velocity of the generator falls below a lower limit value and then exceeds that value.

35. Apparatus in accordance with claim 31, wherein the rotor comprises a teetering-hub and the blade means comprises a pair of pre-twisted blades extending oppositely from the teetering-hub with a predetermined initial coning angle therebetween.

36. Apparatus in accordance with claim 31, wherein the rotor and induction generator are mounted at the top of a tower having its base supported on a horizontal pivot, two pairs of guy wire elements extending from the tower to the ground in orthogonal planes, respectively, one plane being perpendicular to the pivot and the other plane containing the pivot, and a gin pole extending in said one plane from the tower base to one of the guy wire elements and being fixed to that guy wire element.

37. Wind-driven generator apparatus having a rotor with at least one rotor blade, the blade comprising an airfoil configured and disposed relative to a plane of rotation of the rotor in a manner causing centrifugal force which acts on the blade when it rotates to produce a twisting force on the blade tending to change the pitch of the blade about a longitudinal blade axis, and pitch fixing means associated with the blade for preventing the twisting force from changing the blade pitch until the twisting force exceeds a predetermined value corresponding to a normal rotational velocity of the rotor, and allowing the twisting force to change the blade pitch when said predetermined value is exceeded, thereby limiting the speed of the rotor.

38. Apparatus as claimed in claim 37 wherein the blade includes an elongate spar extending lengthwise within the airfoil, and wherein the pitch fixing means comprises stop means connected to the root of the airfoil and means for biasing the root of the spar relative to the stop means.

39. Apparatus as claimed in claim 37 wherein the blade includes an elongate spar which extends lengthwise of the blade internally of the airfoil, the airfoil having a hollow inboard portion through which an inboard portion of the spar passes freely, and wherein the blade changes pitch by twisting of the entire blade about said longitudinal blade axis accompanied by relative twisting between the inboard portions of the spar and the airfoil.

* * * * *